United States Patent
Wakabayashi et al.

(10) Patent No.: US 7,351,782 B2
(45) Date of Patent: *Apr. 1, 2008

(54) ONE-PART CURABLE COMPOSITION

(75) Inventors: Katsuyu Wakabayashi, Nishinomiya (JP); Toshihiko Okamoto, Akashi (JP); Hiroshi Ando, Akashi (JP)

(73) Assignee: Kaneka Corporation, Osaka (JP)

( * ) Notice: Subject to any disclaimer, the term of this patent is extended or adjusted under 35 U.S.C. 154(b) by 64 days.

This patent is subject to a terminal disclaimer.

(21) Appl. No.: 10/529,752

(22) PCT Filed: Sep. 22, 2003

(86) PCT No.: PCT/JP03/12113

§ 371 (c)(1),
(2), (4) Date: Mar. 30, 2005

(87) PCT Pub. No.: WO2004/031299

PCT Pub. Date: Apr. 15, 2004

(65) Prior Publication Data

US 2006/0264545 A1   Nov. 23, 2006

(30) Foreign Application Priority Data

Oct. 2, 2002 (JP) ............... 2002-290538
Jan. 27, 2003 (JP) ............... 2003-018064

(51) Int. Cl.
*C07G 77/60* (2006.01)

(52) U.S. Cl. ............... 528/18; 528/17; 528/21; 528/35

(58) Field of Classification Search ............ None
See application file for complete search history.

(56) References Cited

U.S. PATENT DOCUMENTS

| | | | |
|---|---|---|---|
| 4,449,938 A | 5/1984 | Pollak | |
| 4,507,469 A | 3/1985 | Mita et al. | |
| 4,657,978 A * | 4/1987 | Wakabayashi et al. | 525/100 |
| 4,720,530 A * | 1/1988 | Wurminghausen et al. | 528/18 |
| 4,873,305 A | 10/1989 | Cavezzan et al. | |
| 5,026,811 A * | 6/1991 | Kookootsedes | 528/14 |
| 5,223,583 A | 6/1993 | Higuchi et al. | |
| 6,410,640 B1 | 6/2002 | Fukunaga et al. | |
| 6,486,289 B1 | 11/2002 | Yamaguchi et al. | |
| 6,720,373 B2 | 4/2004 | Lin et al. | |
| 7,115,695 B2 | 10/2006 | Okamoto et al. | |
| 2004/0198885 A1 | 10/2004 | Okamoto et al. | |
| 2005/0171315 A1 | 8/2005 | Wakabayashi et al. | |

FOREIGN PATENT DOCUMENTS

| | | |
|---|---|---|
| EP | 0 473 793 A1 | 3/1992 |
| JP | 52073998 A | 6/1977 |
| JP | 55009669 A | 1/1980 |
| JP | 63006003 A | 1/1988 |
| JP | 63006041 A | 1/1988 |
| JP | 1038407 A | 2/1989 |
| JP | 3072527 A | 3/1991 |
| JP | 5-39428 A | 2/1993 |
| JP | 5039428 A | 2/1993 |
| JP | 5125272 A | 5/1993 |
| JP | 6322251 A | 11/1994 |
| JP | 8231758 A | 9/1996 |
| JP | 11116686 A | 4/1999 |
| JP | 3062626 B2 | 7/2000 |
| JP | 2000-345054 A | 12/2000 |
| JP | 2001-342363 A | 12/2001 |
| JP | 2002-020458 A | 1/2002 |
| JP | 2002-20458 A | 1/2002 |
| WO | WO 03/011978 A1 | 2/2003 |

* cited by examiner

*Primary Examiner*—Marc S. Zimmer
(74) *Attorney, Agent, or Firm*—Sughrue Mion, PLLC

(57) ABSTRACT

The present invention provides a one-part curable composition, comprising (A) an organic polymer having a silicon-containing group capable of cross-linking by forming siloxane bonds; (B) a metal carboxylate; and (C) a carboxylic acid smaller in molar quantity than the (B) component metal carboxylate, the one-part curable composition being simultaneously practical in recovery ratio, durability, creep resistance, storage stability and adhesion.

18 Claims, No Drawings

ONE-PART CURABLE COMPOSITION

RELATED APPLICATION

This application is a national stage entry of PCT application PCT/JP2003/012113 filed on Sep. 22, 2003, claiming priority to Japanese Application No. 2002-290538 filed on Oct. 2, 2002 and Japanese Application No. 2003-18064 filed on Jan. 27, 2003.

TECHNICAL FIELD

The present invention relates to a one-part curable composition comprising an organic polymer having a silicon-containing group (hereinafter also referred to as "reactive silicon groups") capable of cross-linking by forming siloxane bonds.

BACKGROUND ART

It is known that an organic polymer having at least one reactive silicon group in the molecule has an interesting property such that even at room temperature the organic polymer yields a rubber-like cured substance through cross-linking based on the formation of a siloxane bond involving the hydrolysis reaction of the reactive silicon group caused by moisture and the like.

Among these reactive silicon group-containing polymers, polyoxyalkylene polymers and polyisobutylene polymers, which are disclosed in (Patent Document 1), (Patent Document 2), (Patent Document 3), (Patent Document 4), (Patent Document 5), (Patent Document 6), (Patent Document 7), and the like, have already been industrially produced to be widely used in applications to sealants, adhesives, coating materials and the like.

When resins for use in adhesives used as adhesives for interior panels, adhesives for external panels, adhesives for tiling, adhesives for stone tiling, adhesives for finishing walls and adhesives for vehicle panels and the like are poor in recovery property and creep resistance, the adhesive layers are distorted with time due to the weights of the adherends and external stress to displace panels, tiles and stone pieces as the case may be. Additionally, when adhesives for finishing ceilings and adhesives for finishing floors are poor in recovery property and creep resistance, the adhesive layers are distorted with time to form irregularities on the ceiling surfaces and floor surfaces as the case may be. Moreover, adhesives for assembling electric, electronic and precision instruments are poor in recovery property and creep resistance, the adhesive layers are distorted with time to lead to performance degradation of these instruments as the case may be. Accordingly, the compositions to be used in these adhesives are required to be excellent in recovery property and creep resistance.

Sealants are generally used for the purpose of imparting water tightness and air tightness by filling these materials in the joints and gaps between various members. Accordingly, because the property to follow over a long period the portions to which these adhesives are used is extremely important, the physical properties of the cured substances of these adhesives are required to be excellent both in recovery property and in durability. Particularly, excellent recovery property and durability are required for compositions to be used for sealants for working joints in buildings with large joint variation (cap pieces, periphery of window glass, periphery of window frame/window sash, curtain wall, various exterior panels), sealants for direct glazing, sealants for double glazing, sealants for the SSG technique and the like.

The curable compositions containing these reactive silicon group-containing organic polymers are cured by use of silanol condensation catalysts; usually organotin based catalysts having carbon-tin bonds such as dibutyltin bis(acetylacetonate) are widely used. However, in these years, organotin compounds have been pointed out to have toxicity, and additionally, there is a drawback such that the use of organotin catalysts degrades the recovery property and the creep resistance of curable compositions.

On the other hand, as described in (Patent Document 8), (Patent Document 9), (Patent Document 10) and (Patent Document 11), divalent tin carboxylates can also be used as silanol condensation catalysts. The use of these divalent tin carboxylates yields cured substances improved in recovery ratio and creep resistance. The use of divalent tin carboxylates in combination with amine compounds can improve the curability.

However, there has been a problem that the curability of a one-part curable composition prepared by use of a divalent tin catalyst is found to be degraded after storage. (Patent Document 11) discloses a technique which does not cause the curing retardation after storage by virtue of using a non-phthalate based plasticizer even when a divalent tin catalyst is used.

Additionally, (Patent Document 12) describes a technique to decrease the stress while a high recovery ratio is maintained, by adding an acid and an amine compound each in a content larger than the equimolecular amount in relation to a tin-type curing catalyst.

[Patent Document 1] Japanese Patent Laid-Open No. 52-73998
[Patent Document 2] Japanese Patent Laid-Open No. 5-125272
[Patent Document 3] Japanese Patent Laid-Open No. 3-72527
[Patent Document 4] Japanese Patent Laid-Open No. 63-6003
[Patent Document 5] Japanese Patent Laid-Open No. 63-6041
[Patent Document 6] Japanese Patent Laid-Open No. 1-38407
[Patent Document 7] Japanese Patent Laid-Open No. 8-231758
[Patent Document 8] Japanese Patent Laid-Open No. 55-9669
[Patent Document 9] Japanese Patent No. 3062626
[Patent Document 10] Japanese Patent Laid-Open No. 6-322251
[Patent Document 11] Japanese Patent Laid-Open No. 2000-345054
[Patent Document 12] Japanese Patent Laid-Open No. 11-116686

DISCLOSURE OF THE INVENTION

The present inventors have found that there can be obtained a one-part curable composition which is satisfactory in recovery ratio and creep resistance and small in curing retardation after storage by adding a carboxylic acid to a metal carboxylate.

Moreover, the present inventors have found a problem that the adhesion is degraded when the added amount of a carboxylic acid is too large in the case where a metal carboxylate is used as a catalyst.

An object of the present invention is to provide a one-part curable composition containing as a main component a reactive silicon group-containing organic polymer, the composition being, by use of a non-organotin catalyst, small in curing variation between before and after storage, practical in curability, satisfactory in recovery property and creep resistance, and satisfactory in adhesion.

As a result of a diligent investigation to solve such problems, the present inventors perfected the present invention by finding that there can be obtained a one-part curable composition in which the recovery property and the creep resistance thereof are improved by use of a metal carboxylate as a silanol condensation catalyst for the above described polymer, the curing retardation thereof after storage is suppressed by adding a carboxylic acid, and moreover, degradation of the adhesion thereof is suppressed by limiting the added amount of the carboxylic acid.

More specifically, the present invention relates to a one-part curable composition comprising:

(A) an organic polymer having a silicon-containing groups capable of cross-linking by forming siloxane bonds;

(B) a metal carboxylate; and (C) a carboxylic acid smaller in molar quantity than the (B) component metal carboxylate.

A preferred embodiment relates to the above described one-part curable composition, in which the (A) component organic polymer has a number average molecular weight falling within a range from 500 to 50000, and has on average, at the terminal of the main chain and/or the side chains, one or more silicon-containing groups per one molecule represented by the general formula (1):

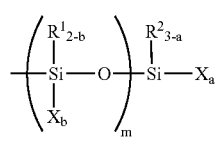

where $R^1$ and $R^2$ are each independently an alkyl group having 1 to 20 carbon atoms, an aryl group having 6 to 20 carbon atoms, an aralkyl group having 7 to 20 carbon atoms or a triorganosiloxy group represented by $(R')_3SiO$— (R's are each independently a substituted or a non-substituted hydrocarbon group having 1 to 20 carbon atoms); additionally, Xs are each independently a hydroxy or a hydrolyzable group; moreover, a is any one of 0, 1, 2, and 3, b is any one of 0, 1, and 2, and a and b are not to be 0 simultaneously; and m is 0 or an integer of 1 to 19.

Another preferred embodiment relates to the above described one-part curable composition, in which X is an alkoxy group.

Another preferred embodiment relates to any one of the above described one-part curable compositions, in which the (A) component organic polymer is one or more polymers selected from the group consisting of a polyoxyalkylene polymer, a saturated hydrocarbon polymer and a (meth) acrylate polymer.

Another preferred embodiment relates to the above described one-part curable composition, in which the polyoxyalkylene polymer is a polyoxypropylene polymer.

Another preferred embodiment relates to any one of the above described one-part curable compositions, in which the (B) component is a tin carboxylate.

Another preferred embodiment relates to the above described one-part curable composition, in which the (B) component is a divalent tin carboxylate.

Another preferred embodiment relates to any one of the above described one-part curable compositions, in which the (B) component is a metal carboxylate in which the carbon atom adjacent to the carbonyl group constituting the carboxylic acid is a quaternary carbon atom.

Another preferred embodiment relates to any one of the above described one-part curable compositions, in which the (C) component is a fatty acid.

Another preferred embodiment relates to the above described one-part curable composition, in which the (C) component is a carboxylic acid in which the carbon atom adjacent to the carbonyl group is a quaternary carbon atom.

Another preferred embodiment relates to any one of the above described one-part curable compositions, comprising the (B) component in a content of 0.01 to 20 parts by weight and the (C) component smaller in molar quantity than the (B) component and in a content of 0.01 to 20 parts by weight in relation to 100 parts by weight of the (A) component.

Another preferred embodiment relates to any one of the above described one-part curable compositions, further comprising an amine compound as the (D) component.

Another preferred embodiment relates to the above described one-part curable composition, in which the (D) component amine compound is a primary amine.

Another preferred embodiment relates to any one of the above described one-part curable compositions, in which the (D) component amine compound is an amine compound containing as a substituent a hydrocarbon group containing at least one hetero atom.

Another preferred embodiment relates to the above described one-part curable composition, in which the (D) component amine compound is an amine compound containing a hydrocarbon group having a hetero atom on the carbon atom at position 2, 3 or 4.

Another preferred embodiment relates to any one of the above described one-part curable compositions, comprising 0.01 to 20 parts by weight of the (D) component in relation to 100 parts by weight of the (A) component.

Additionally, as a preferred embodiment of the curable composition involved in the present invention, there can be cited an adhesive for interior panel, an adhesive for exterior panel, an adhesive for tiling, an adhesive for stone tiling, an adhesive for finishing ceiling, an adhesive for finishing floor, an adhesive for finishing wall, an adhesive for vehicle panel, an adhesive for assembling electric, electronic and precision instruments, a sealant for direct glazing, a sealant for double glazing, a sealant for the SSG technique or a sealant for working joints of buildings, each including any one of the above described one-part curable compositions.

As described above, the one-part curable composition, comprising (A) an organic polymer having a silicon-containing group capable of cross-linking by forming siloxane bonds, (B) a metal carboxylate, and (C) a carboxylic acid smaller in molar quantity than the (B) component metal carboxylate, provides a cured substance which has a high recovery ratio and a high creep resistance, scarcely displays degradation of the curing activity after storage, and has a satisfactory adhesion.

BEST MODE FOR CARRYING OUT THE INVENTION

The details of the present invention will be described below.

No particular constraint is imposed on the main chain skeleton of the organic polymer having a reactive silicon group to be used in the present invention, and polymers having various types of main chain skeletons can be used.

More specifically, examples of the organic polymer include polyoxyalkylene polymers such as polyoxyethylene, polyoxypropylene, polyoxybutylene, polyoxytetramethylene, polyoxyethylene-polyoxypropylene copolymer, and polyoxyprolylene-polyoxybutylene copolymer; hydrocarbon polymers such as ethylene-propylene copolymer, polyisobutylene, copolymers between isobutylene and isoprene and the like, polychloroprene, polyisoprene, copolymers between isoprene or butadiene and acrylonitrile and/or styrene and the like, polybutadiene, copolymers between isoprene or butadiene and acrylonitrile, styrene and the like, hydrogenated polyolefin polymers obtained by hydrogenation of these polyolefin polymers; polyester polymers obtained by the condensation between dibasic acids such as adipic acid and glycol, or by the ring-opening polymerization of lactones; (meth)acrylate polymers obtained by radical polymerization of the monomers such as ethyl (meth) acrylate and butyl (meth)acrylate; vinyl polymers obtained by radical polymerization of the monomers such as (meth) acrylate monomers, vinyl acetate, acrylonitrile and styrene; graft polymers obtained by polymerization of vinyl monomers in the above described organic polymers; polysulfide polymers; polyamide polymers such as nylon 6 obtained by ring-opening polymerization of ε-caprolactam, nylon 6,6 obtained by condensation polymerization between hexamethylenediamine and adipic acid, nylon 6, 10 obtained by condensation polymerization between hexamethylenediamine and sebacic acid, nylon 11 obtained by condensation polymerization of ε-aminoundecanoic acid, nylon 12 obtained by ring-opening polymerization of ε-aminolaurolactam, and copolymerized nylons containing two or more components of the above described nylons; polycarbonate polymers manufactured by condensation polymerization of, for example, bisphenol A and carbonyl chloride; and diaryl phthalate polymers. Among the polymers having the above described main chain skeletons, polyoxyalkylene polymers, hydrocarbon polymers, polyester polymers, (meth)acrylate polymers, and polycarbonate polymers are preferable because these polymers are easily available and can be easily manufactured.

Moreover, saturated hydrocarbon polymers such as polyisobutylene, hydrogenated polyisoprene, hydrogenated polybutadiene, polyoxyalkylene polymers and (meth)acrylate polymers are particularly preferable because these polymers are relatively low in glass transition temperature and yield cured substances excellent in low-temperature resistance.

The reactive silicon group contained in the organic polymer having a reactive silicon group is a group which has a hydroxy or hydrolyzable group bonded to a silicon atom, and is capable of cross-linking by forming a siloxane bond through a reaction accelerated by a silanol condensation catalyst. As the reactive silicon group, there can be cited a group represented by the general formula (1):

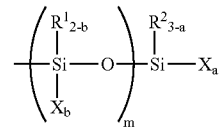

(1)

where $R^1$ and $R^2$ are each independently an alkyl group having 1 to 20 carbon atoms, an aryl group having 6 to 20 carbon atoms, an aralkyl group having 7 to 20 carbon atoms or a triorganosiloxy group represented by $(R')_3SiO-$ (R's are each independently a substituted or a unsubstituted hydrocarbon group having 1 to 20 carbon atoms); additionally, each X is independently a hydroxy or a hydrolyzable group; moreover, a is any one of 0, 1, 2, and 3, b is any one of 0, 1, and 2, and a and b are not to be 0 simultaneously; and m is 0 or an integer of 1 to 19.

No particular constraint is imposed on the hydrolyzable group, and the hydrolyzable group has only to be a hydrolyzable group well known in the art. More specifically, examples of the hydrolyzable group include a hydrogen atom, a halogen atom, an alkoxy group, an acyloxy group, a ketoximate group, an amino group, an amide group, an acid amide group, an aminooxy group, a mercapto group, and an alkenyloxy group. Among these groups, a hydrogen atom, an alkoxy group, an acyloxy group, a ketoximate group, an amino group, an amide group, an aminooxy group, a mercapto group and an alkenyloxy group are preferable; an alkoxy group is particularly preferable from the viewpoint that an alkoxy group is moderately hydrolyzable and easily handlable.

To a silicon atom, 1 to 3 hydrolyzable groups and 1 to 3 hydroxy groups can be bonded, and (a+m×b) falls preferably in the range from 1 to 5. When 2 or more hydrolyzable groups and 2 or more hydroxy groups are bonded in a reactive silicon group, the hydrolyzable groups may be the same or different and this is also the case for the hydroxy group.

In particular, a reactive silicon group represented by the general formula (2) is preferable because it is easily available:

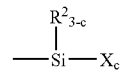

(2)

where $R^2$ and X are the same as described above, and c is an integer of 1 to 3.

Additionally, specific examples of $R^1$ and $R^2$ in the above general formulas (1) and (2) include alkyl groups such as a methyl group and an ethyl group; cycloalkyl groups such as a cyclohexyl group; aryl groups such as a phenyl group; aralkyl groups such as a benzyl group; and a triorqanosiloxy group represented by $(R')_3SiO-$ in which R' is a methyl group, a phenyl group or the like. Among these groups, a methyl group is particularly preferable.

More specific examples of the reactive silicon group include a trimethoxysilyl group, a triethoxysilyl group, a triisopropoxysilyl group, a dimethoxymethylsilyl group, a diethoxymethylsilyl group, and a diisopropoxymethylsilyl group. A trimethoxysilyl group, a triethoxysilyl group and a dimethoxymetylsilyl group are more preferable because these groups are high in activity and yield satisfactory curable compositions, and a trimethoxysilyl group is particularly preferable. Additionally, from the viewpoint of storage stability, a dimethoxymethylsilyl group is particularly preferable. The reactive silicon groups having three hydrolyzable groups on the silicon atom such as a trimethoxysilyl group, a triethoxysilyl group and a triisopropoxysilyl group are particularly preferable from the viewpoint of the recovery property, durability and creep resistance of the curable compositions obtained. Additionally, a triethoxysilyl group is particularly preferable because the alcohol produced by the hydrolysis reaction of the reactive silicon group is ethanol and hence a triethoxysilyl group has a high safety.

The introduction of the reactive silicon group can be carried out by methods well known in the art. More specifically, examples of such methods include the following:

(a) With an organic polymer having in the molecule functional groups such as hydroxy groups, an organic compound having both an active group exhibiting reactivity to the functional groups and an unsaturated group is reacted, to yield an unsaturated group-containing organic polymer. Alternatively, an unsaturated group-containing organic polymer is obtained by copolymerization of an epoxy compound having an unsaturated group with an organic polymer having in the molecule functional groups such as hydroxy groups. Then, a reactive silicon group-containing hydrosilane is reacted with the reaction product to be hydrosilylated.

(b) With an unsaturated group-containing organic polymer, obtained similarly to the method described in (a), a mercapto group- and reactive silicon group-containing compound is reacted.

(c) With an organic polymer having in the molecule functional groups such as hydroxy groups, epoxy groups and isocyanate groups, a compound having a functional group exhibiting reactivity to the functional groups and a reactive silicon group is reacted.

Among the above methods, a method described in (a) or a method described in (c) in which a hydroxy group-terminated polymer is reacted with an isocyanate group- and reactive silicon group-containing compound is preferable because the method provides a high conversion rate for a relatively short reaction time. Additionally, the method described in (a) is particularly preferable because an organic polymer having a reactive silicon group obtained by the method described in (a) is lower in viscosity and more satisfactory in workability than an organic polymer obtained by the method described in (c), and an organic polymer obtained by the method described in (b) is strong in odor due to mercaptosilane.

Specific examples of the hydrosilane compound used in the method described in (a) include halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane and phenyldimethoxysilane; acyloxysilanes such as methyldiacetoxysilane and phenyldiacetoxysilane; and ketoximatesilanes such as bis(dimethylketoximate)methylsilane and bis(cyclohexylketoximate)methylsilane; however, the hydrosilane compound used in the method described in (a) is not limited to these compounds. Among these examples, halogenated silanes and alkoxysilanes are preferable; in particular, alkoxysilanes are most preferable because the obtained curable compositions are moderately hydrolyzable and easily handlable. Among the alkoxysilanes, methyldimethoxysilane is particularly preferable because methyldimethoxysilane is easily available, and the curing, storage stability, elongation property, and tensile strength of the cured substance containing the obtained organic polymers are high.

Among the above described hydrosilanes, hydrosilane compounds represented by the general formula (3) are preferable because significant is the improvement effect on the recovery property, durability and creep resistance of each of the curable compositions made of organic polymers obtained from addition reaction of the hydrosilane compounds concerned:

$$H\text{—}SiX_3 \qquad (3)$$

where three Xs each independently denote a hydroxy group or a hydrolyzable group. Among the hydrosilane compounds represented by the general formula (3), trialkoxysilanes such as trimethoxysilane, triethoxysilane and triisopropoxysilane are more preferable.

Among the above described trialkoxysilanes, trialkoxysilanes such as trimethoxysilane having alkoxy groups (methoxy groups) each having one carbon atom sometimes undergoes rapidly proceeding disproportionation reaction, which yields fairly dangerous compounds such as dimethoxysilane. From the viewpoint of handling safety, it is preferable to use trialkoxysilanes each containing alkoxy groups having two or more carbon atoms represented by the general formula (4):

$$H\text{—}Si(OR^3)_3 \qquad (4)$$

where three $R^3$ each are independently a monovalent organic group having 2 to 20 carbon atoms. Triethoxysilane is most preferable from the viewpoint of the availability and handling safety thereof, and from the viewpoint of the recovery property, durability and creep resistance of each of the obtained curable compositions.

Examples of the synthesis method described in (b) include a method in which a mercapto group- and reactive silicon group-containing compound is introduced into the sites on the unsaturated bonds of an organic polymer by means of a radical addition reaction in the presence of a radical initiator and/or a radical generating source; however, the synthesis method concerned is not limited to these methods. Examples of the above described mercapto group- and reactive silicon group-containing compound include γ-mercaptopropyltrimethoxysilane, γ-mercaptopropylmethyldimethoxysilane, γ-mercaptopropyltriethoxysilane and γ-mercaptopropylmethyldiethoxysilane; however, the mercapto group- and reactive silicon group-containing compound is not limited to these compounds.

Examples of the method, of the methods described in (c), in which a hydroxy-terminated polymer is reacted with an isocyanate group- and reactive silicon group-containing compound include a method disclosed in Japanese Patent Laid-Open No. 3-47825; however, the method concerned is not limited to these methods. Examples of the above described isocyanate group- and reactive silicon group-containing compound include γ-isocyanatopropyltrimethoxysilane, γ-isocyanatopropylmethyldimethoxysilane, γ-isocyanatopropyltriethoxysilane, and γ-isocyanatopropylmethyldiethoxysilane; however, the compound concerned is not limited to these compounds.

As described above, silane compounds each having three hydrolyzable groups bonded to one silicon atom such as trimethoxysilane sometimes undergo proceeding disproportionation reaction, which yields compounds of which reaction is difficult to control, such as highly reactive dimethoxysilane. However, with γ-mercaptopropyltrimethoxysilane and γ-isocyanatopropyltrimethoxysilane, no such reaction proceeds. Accordingly, when as the silicon-containing group, there is used a group having three hydrolyzable groups bonded to a silicon atom such as a trimethoxysilyl group and the like, it is preferable to use the synthesis methods described in (b) or (c).

The organic polymer having a reactive silicon group may be a straight chain or may have branches, and the number average molecular weight thereof, measured by GPC relative to polystyrene standard, is preferably about 500 to 50,000, and more preferably 1,000 to 30,000. When the number average molecular weight is less than 500, there is found an adverse trend involving the elongation property, while when the number average molecular weight exceeds 50000, there is found an adverse trend involving the workability because the viscosity becomes high.

For the purpose of obtaining a rubber-like cured substance having a high strength, a high elongation property and a low elastic modulus, it is recommended that the number of the reactive groups contained in the organic polymer having a reactive silicon group is, on average in one polymer molecule, at least one, and preferably 1.1 to 5. When the average number of the reactive groups contained in a molecule is less than 1, the curability becomes insufficient, and hence a satisfactory rubber elasticity behavior can hardly be exhibited. The reactive silicon group may be located at the terminals of the organic polymer molecule chain or inside the chain, or both at the terminals and inside the chain. In particular, when the reactive silicon groups are located at the molecular terminals, the effective network chain content in the organic polymer component contained in the finally formed cured substance becomes large, so that it becomes easier to obtain a rubber-like cured substance having a high strength, a high elongation property and a low elastic modulus.

Additionally, in the present invention, for the purpose of obtaining a cured substance having a high recovery property, a high durability and a high creep resistance, there can be used an organic polymer in which the average number of the reactive silicon groups contained in a molecule is 1.7 to 5. A cross-linked cured substance obtained using such an organic polymer through the silanol condensation involving the reactive silicon groups exhibits a satisfactory recovery property, and also exhibits marked improvement effects of the creep resistance and the durability as compared to the case where an organic polymer in which the average number of the reactive silicon groups per molecule is less than 1.7. From the viewpoint of the improvement of the recovery property, durability and creep resistance, the average number of the reactive silicon groups contained in one molecule of the organic polymer is more preferably 2 to 4, and particularly preferably 2.3 to 3. When the number of the reactive silicon groups per molecule is less than 1.7, the improvement effect of recovery property, durability and creep resistance of a cured substance of the present invention is sometimes insufficient, while when the number of the groups concerned is larger than 5, the elongation of the obtained cured substance sometimes becomes small.

The above described polyoxyalkylene polymer is essentially a polymer having the repeating units represented by the general formula (5):

—R$^4$—O—  (5)

where R$^4$ is a divalent organic group which has 1 to 14 carbon atoms and is a straight chain or branched alkylene group. In the general formula (5), R$^4$ is preferably a straight chain or branched alkylene group having 1 to 14 carbon atoms, and more preferably 2 to 4 carbon atoms. Examples of the repeating units represented by the general formula (5) include:

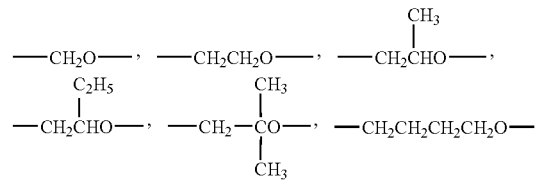

The main chain skeleton of the polyoxyalkylene polymer may be formed of either only one type of repeating unit or two or more types of repeating units. In particular, in the case where the polymer is used for a sealant and the like, it is preferable that the main chain skeleton is formed of a polymer containing as the main component a propyleneoxide polymer because a polymer having such a main chain skeleton is amorphous and relatively low in viscosity.

Examples of the synthesis method of the polyoxyalkylene polymer include a polymerization method based on an alkaline catalyst such as KOH; a polymerization method based on a transition metal compound-porphyrin complex catalyst prepared by reacting an organoaluminum compound with porphyrin, disclosed in Japanese Patent Laid-Open No. 61-215623; polymerization methods based on double metal cyanide complex catalysts, disclosed in Japanese Patent Publication Nos. 46-27250 and 59-15336, and U.S. Pat. Nos. 3,278,457, 3,278,458, 3,278,459, 3,427,256, 3,427,334, 3,427,335 and the like; a polymerization method using a catalyst composed of a polyphosphazene salt disclosed in Japanese Patent Laid-Open No. 10-273512, and a polymerization method using a catalyst composed of a phosphazene compound disclosed in Japanese Patent Laid-Open No. 11-060722. However, the method concerned is not limited to these methods.

The main chain skeleton of the above described polyoxyalkylene polymer may include other components such as binding urethane components as far as such inclusion does not largely impair the effect of the present invention.

No particular constraint is imposed on the above described binding urethane component; examples of the binding urethane component can include the compounds obtained by the reaction between the polyols having the repeating units represented by the above general formula (5) and polyisocyanate compounds covering aromatic polyisocyanates such as toluene(tolylene)diisocyanate, diphenylmethane diisocyanate and xylene diisocyanate; and aliphatic polyisocyanates such as isophorone diisocyanate and hexamethylene diisocyanate.

When amide segments (—NR″—CO—) contained in the (thio)urethane bonds, urea bonds, substituted urea bonds and the like produced in the main chain skeleton on the basis of the above described urethane reaction are abundant, R″ being a hydrogen atom or a substituted or a unsubstituted monovalent hydrocarbon group, the viscosity of the organic polymer becomes high and forms a composition poor in workability as the case may be. Accordingly, the amount of the amide segments occupying the main chain skeleton of the organic polymer is preferably 3 wt % or less, more preferably 1 wt % or less, and most preferably substantially null.

Examples of the manufacturing method of the reactive silicon group-containing polyoxyalkylene polymer include the methods disclosed in Japanese Patent Publication Nos. 45-36319 and 46-12154, Japanese Patent Laid-Open Nos. 50-156599, 54-6096, 55-13767, 55-13468, 57-164123, Japanese Patent Publication No. 3-2450, and U.S. Pat. Nos. 3,632,557, 4,345,053, 4,366,307 and 4,960,844; and the methods manufacturing polyoxyalkylene polymers each having a high molecular weight such that the number average molecular weight is 6,000 or more and a narrow molecular weight distribution such that the Mw/Mn value is 1.6 or less, disclosed in Japanese Patent Laid-Open Nos. 61-197631, 61-215622, 61-215623, 61-218632, 3-72527, 3-47825 and 8-231707. However, the method concerned is not limited to these methods.

The above described reactive silicon group-containing polyoxyalkylene polymers may be used either each alone or in combinations of two or more thereof.

The above described saturated hydrocarbon polymers are the polymers which substantially do not contain carbon-carbon unsaturated bonds other than aromatic rings; the polymers forming the skeletons of the saturated hydrocarbon polymers can be obtained by the methods in which (1) olefin compounds having 1 to 6 carbon atoms such as ethylene, propylene, 1-butene and isobutylene are polymerized as main monomers, and (2) diene compounds such as butadiene and isoprene are homopolymerized or copolymerized with the above described olefin compounds and then hydrogenation is applied; however, isobutylene polymers and hydrogenated polybutadiene polymers are preferable because functional groups can be easily introduced into the terminals of these polymers, the molecular weights of these polymers can be easily controlled and the number of the terminal functional groups can be increased; and isobutylene polymers are particularly preferable because of the ease of the synthesis thereof.

The polymers having saturated hydrocarbon polymers as the main chain skeleton are characterized in that the polymers each having such a skeleton are excellent in heat resistance, weather resistance, durability and moisture blocking property.

The isobutylene polymers may be formed in such a way that all the monomer units are solely isobutylene units, or my be copolymers with monomers other than isobutylene units; however, from the viewpoint of the rubber property, in each of the polymers concerned, the content of the units derived from isobutylene is preferably 50 wt % or more, more preferably 80 wt % or more, and most preferably 90 to 99 wt %.

As for the synthesis methods of saturated hydrocarbon polymers, various types of polymerization methods have hitherto been reported, particularly among which are many so-called living polymerization methods developed in these years. It has been known that the saturated hydrocarbon polymers, in particular, the isobutylene polymers can be easily produced by use of the inifer polymerization discovered by Kennedy et al. (J. P. Kennedy et al., J. Polymer Sci., Polymer Chem. Ed., Vol. 15, p. 2843 (1997)) in such a way that polymers having the molecular weights of the order of 500 to 100,000 can be polymerized with the molecular weight distribution of 1.5 or less and various types of functional groups can be introduced into the molecular terminals.

The manufacturing methods of the reactive silicon group-containing saturated hydrocarbon polymers are described, for example, in Japanese Patent Publication Nos. 4-69659 and 7-108928, Japanese Patent Laid-Open Nos. 63-254149, 64-22904 and 1-197509, Japanese Patent Nos. 2539445 and 2873395, Japanese Patent Laid-Open No. 7-53882 and the like; however, the methods concerned are not particularly limited to these methods.

The above described reactive silicon group-containing saturated hydrocarbon polymers may be used either each alone or in combinations of two or more thereof.

No particular constraint is imposed on the (meth)acrylate monomers constituting the main chains of the above described (meth)acrylate polymers, but various types can be used. Examples of the monomers concerned include (meth)acrylic acid monomers such as (meth)acrylic acid, methyl (meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl (meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl (meth)acrylate, dodecyl(meth)acrylate, phenyl(meth)acrylate, tolyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, γ-(methacryloyloxypropyl) dimethoxymethylsilane, ethylene oxide adduct of (meth) acrylate, trifluoromethylmethyl(meth)acrylate, 2-trifluoromethylethyl(meth)acrylate, 2-perfluoroethylethyl (meth)acrylate, 2-perfluoroethyl-2-perfluorobutylethyl (meth)acrylate, 2-perfluoroethyl(meth)acrylate, perfluoromethyl(meth)acrylate, diperfluoromethlymethyl(meth) acrylate, 2-perfluoromethyl-2-perfluoroethylmethyl(meth) acrylate, 2-perfluorohexylethyl(meth)acrylate, 2-perfluorodecylethyl(meth)acrylate and 2-perfluorohexadecylethyl(meth)acrylate. For the above described (meth) acrylate polymers, (meth)acrylate monomers can be copolymerized with the following vinyl monomers. Examples of the vinyl monomers concerned include styrene monomers such as styrene, vinyltoluene, α-methylstyrene, chlorostyrene, and styrenesulfonic acid and the salts thereof; fluorine containing vinyl monomers such as perfluoroethylene, perfluoropropylene and fluorinated vinylidene; silicon containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide; nitrile group containing vinyl monomers such as acrylonitrile and methacrylonitrile; amide group containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; and vinyl chloride, vinylidene chloride, allyl chloride and allylalcohol. These monomers may be used either each alone or two or more of these monomers may be copolymerized. Among these, from the viewpoint of the physical properties of the products, polymers formed of styrene monomers and (meth)acrylic acid monomers are preferable. More preferable are the (meth)acryl polymers formed of acrylate monomers and methacrylate monomers, and particularly preferable are the acryl polymers formed of acrylate monomers. For general construction applications, the butyl acrylate monomers are further preferable because compositions concerned each are required to have physical properties including a low viscosity, and the cured substances each are required to have physical properties including a low modulus, a high elongation property, a weather resistance and a heat resistance. On the other hand, for applications to vehicles and the like where oil resistance is required, copolymers made of ethyl acrylate as the main material are further preferable. The copolymers made of ethyl acrylate as the main material are excellent in oil resistance, but slightly tend to be poor in low-temperature property (low-temperature resistance); for the purpose of improving the low-temperature property thereof, part of ethyl acrylate can be replaced with butyl acrylate. However, with the increase of the ratio of butyl acrylate, the satisfactory oil resistance comes to be degraded, so that for the application to the use requiring oil resistance, the ratio of butyl acrylate is set preferably at 40% or less, and more preferably at 30% or less. Additionally, it is also preferable to use 2-methoxyethyl acrylate and 2-ethoxyethyl acrylate which have side chain alkyl groups containing oxygen atoms introduced for the purpose of improving the low-temperature property and the like without degrading the oil resistance; in this connection, it is to be noted that the introduction of alkoxy groups having an ether bond in the side chains tends to degrade the heat resistance, so that the ratio of such an acrylate is preferably 40% or less when heat resistance is required. It is possible to obtain appropriate polymers by varying the ratio in consideration of required physical properties such as oil resistance, heat resistance and low-temperature property according to the various applications and the required objectives. Examples of the polymers excellent in the balance between the physical properties including the oil resistance, heat resistance, low-temperature property and the like include a copolymer of ethyl acrylate/butyl acrylate/2-methoxyethyl acrylate (40 to 50/20 to 30/30 to 20 in ratio by weight), this copolymer imposing no constraint on the polymers concerned. In the present invention, these preferable monomers can be copolymerized with other monomers, and moreover, block copolymerized with other monomers; in such cases, it is preferable that the preferable monomers are contained in 40% or more in ratio by weight. Incidentally, it is to be noted that in the above form of presentation, for example, "(meth)acrylic acid" means acrylic acid and/or methacrylic acid.

No particular constraint is imposed on the synthesis methods of the (meth)acrylate polymers, and the methods well known in the art can be applied. However, polymers obtained by the usual free radical methods using azo compounds and peroxides as polymerization initiators have a problem such that the molecular weight distribution values of the polymers are generally larger than 2 and the viscosities of the polymers are high. Accordingly, it is preferable to apply living radical polymerization methods for the purpose of obtaining (meth)acrylate polymers being narrow in molecular weight distribution and low in viscosity, and moreover, having cross-linking functional groups at the molecular chain terminals in a high ratio.

Among "the living radical polymerization methods," "the atom transfer radical polymerization method" in which (meth)acrylate monomers are polymerized by use of an organic halogenated compound or a halogenated sulfonyl compound as an initiator and a transition metal complex as a catalyst has, in addition to the features of the above described "living radical polymerization methods," halogen atoms at the terminals relatively favorable for the functional group conversion reaction and is large in freedom for designing the initiator and the catalyst, so that the atom transfer radical polymerization method is further preferable as a method for manufacturing (meth)acrylate polymers having particular functional groups. Examples of the atom transfer radical polymerization method include the method reported by Matyjaszewski et al. in Journal of the American Chemical Society (J. Am. Chem. Soc.), Vol. 117, p. 5614 (1995).

As a manufacturing method of a reactive silicon group-containing (meth)acrylate polymer, for example, Japanese Patent Publication Nos. 3-14068 and 4-55444, and Japanese Patent Laid-Open No. 6-211922 and the like disclose manufacturing methods which apply the free radical polymerization methods using chain transfer agents. Additionally, Japanese Patent Laid-Open No. 9-272714 and the like disclose a manufacturing method which applies the atom transfer radical polymerization method. However, the manufacturing method concerned is not limited to these methods.

The above described reactive silicon group-containing (meth)acrylate polymers may be used either each alone or in combinations of two or more thereof.

These organic polymers having a reactive silicon group may be used either each alone or in combinations of two or more thereof. Specifically, there can be used organic polymers formed by blending two or more polymers selected from the group consisting of the reactive silicon group-containing polyoxyalkylene polymers, the reactive silicon group-containing saturated hydrocarbon polymers, and the reactive silicon group-containing (meth)acrylate polymers.

The manufacturing methods of the organic polymers formed by blending the reactive silicon group-containing polyoxyalkylene polymers with the reactive silicon group-containing (meth)acrylate polymers are proposed in Japanese Patent Laid-Open Nos. 59-122541, 63-112642, 6-172631, 11-116763 and the like. However, the manufacturing method concerned is not limited to these methods. A preferable specific example is a manufacturing method in which a reactive silicon group-containing polyoxyalkylene polymer is blended with a copolymer formed of two (meth)acrylate monomer units: one (meth)acrylate monomer unit has the reactive silicon groups and alkyl groups having 1 to 8 carbon atoms, and the molecular chain substantially represented by the following general formula (6):

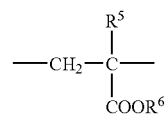

(6)

where $R^5$ represents a hydrogen atom or a methyl group, and $R^6$ represents an alkyl group having 1 to 8 carbon atoms; and the other (meth)acrylate monomer unit has alkyl groups having 10 or more carbon atoms represented by the following formula (7):

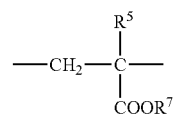

(7)

where $R^5$ is the same as above, and $R^7$ represents an alkyl group having 10 or more carbon atoms.

In the above general formula (6), examples of $R^6$ include alkyl groups having 1 to 8 carbon atoms, preferably 1 to 4 carbon atoms and further preferably 1 to 2 carbon atoms such as a methyl group, an ethyl group, a propyl group, a n-butyl group, a t-butyl group and a 2-ethylhexyl group. It is also to be noted that $R^6$ may represent either one type or admixtures of two or more types.

In the above general formula (7), examples of $R^7$ include long chain alkyl groups having 10 or more carbon atoms, usually 10 to 30 carbon atoms, and preferably 10 to 20 carbon atoms such as a lauryl group, a tridecyl group, a cetyl group, a stearyl group and a behenyl group. It is also to be noted that $R^7$ may represent, similarly to $R^6$, either one type or admixtures of two or more types.

The molecular chains of the above described (meth) acrylate copolymers are substantially formed of the monomer units represented by formulas (6) and (7): "substantially" as referred to here means that in the copolymer concerned the sum content of the monomer unit of formula (6) and the monomer unit of formula (7) exceeds 50 wt %. The sum content of the monomer units of formulas (6) and (7) is preferably 70 wt % or more.

Additionally, the abundance ratio by weight of the monomer unit of formula (6) to the monomer unit of formula (7) is preferably 95:5 to 40:60, and further preferably 90:10 to 60:40.

Examples of the monomer units other than the monomer units of formulas (6) and (7) which may be contained in the above described copolymer include acrylic acids such as acrylic acid and methacrylic acid; monomers containing amide groups such as acrylamide, methacrylamide, N-methylolacrylamide and N-methylolmethacrylamide, epoxy groups such as glycidylacrylate and glycidylmethacrylate, amino groups such as diethylaminoethylacrylate, diethylaminoethylmethacrylate and aminoethyl vinyl ether; and monomer units derived from acrylonitrile, styrene, α-methylstyrene, alkyl vinyl ethers, vinyl chloride, vinyl acetate, vinyl propionate and ethylene.

The organic polymers formed by blending a reactive silicon group-containing saturated hydrocarbon polymer with a reactive silicon group-containing (meth)acrylate copolymer are proposed in Japanese Patent Laid-Open Nos. 1-168764, 2000-186176 and the like. However the organic polymer concerned is not limited to these organic polymers.

Moreover, for the manufacturing method of the organic polymers formed by blending the (meth)acrylate copolymers having the reactive silicon functional groups, there can be used additional methods in which (meth)acrylate monomers are polymerized in the presence of a reactive silicon group-containing organic polymer. These methods are disclosed specifically in Japanese Patent Laid-Open Nos. 59-78223, 59-168014, 60-228516, 60-228517 and the like. However, the method concerned is not limited to these methods.

In the present invention, a metal carboxylate is used as the (B) component. The metal carboxylate functions as a silanol condensation catalyst which can form the siloxane bonds from hydroxy groups or hydrolyzable groups bonded to the silicon atoms contained in the organic polymer that is the (A) component of the present invention; as compared to other silanol condensation catalysts, the metal carboxylate can enhance the recovery property, the durability and the creep resistance of the cured substance to be obtained.

As the (B) component metal carboxylates, tin carboxylates, bismuth carboxylates, lead carboxylates, potassium carboxylates, calcium carboxylates, titanium carboxylates, vanadium carboxylates, cobalt carboxylates, zirconium carboxylates, barium carboxylates, manganese carboxylates, iron carboxylates, nickel carboxylates and cerium caboxylates are prepferable because of high catalytic activity; additionally, tin carboxylates, bismuth carboxylates, lead carboxylates, titanium carboxylates, iron carboxylates and zirconium carboxylates are more preferable; tin carboxylates are particularly preferable; and divalent tin carboxylates are most preferable.

Here, as the carboxylic acids having the acid radicals of the metal carboxylates, preferably used are compounds containing hydrocarbon based carboxylic acid radicals having 2 to 40 carbon atoms inclusive of the carbonyl carbon atom; because of availability, hydrocarbon based carboxylic acids having 2 to 20 carbon atoms are particularly preferably used.

Specific examples include straight chain saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachic acid, behenic acid, lignoceric acid, cerotic acid, montanic acid, melissic acid and lacceric acid; monoene unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid and 10-undecenoic acid; polyene unsaturated fatty acids such as linoelaidic acid, linoleic acid, 10,12-octadecadienoic acid, hiragoic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16, 19-docosatetraenoic acid, 4,8,12,15,18-eicosapentaenoic acid, clupanodonic acid, nishinic acid and docosahexaenoic acid; branched fatty acids such as 1-methylbutyric acid, isobutyric acid, 2-ethylbutyric acid, isovaleric acid, tuberculostearic acid, pivalic acid and neodecanoic acid; fatty acids having a triple bond such as propiolic acid, tariric acid, stearolic acid, crepenynic acid, ximenynic acid and 7-hexadecynoic acid; alicyclic carboxylic acids such as naphthenic acid, malvalic acid, sterculic acid, hydnocarpic acid, chaulmoogric acid and gorlic acid; oxygen containing fatty acids such as acetoacetic acid, ethoxy acetic acid, glyoxylic acid, glycolic acid, gluconic acid, sabinic acid, 2-hydroxytetradecanoic acid, ipurolic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinoleic acid, camlolenic acid, licanic acid, pheronic acid and cerebronic acid; and halogen substituted monocarboxylic acids such as chloroacetic acid, 2-chloroacrylic acid and chlorobenzoic acid. Examples of aliphatic dicarboxylic acids include saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid; and unsatureated dicarboxylic acids such as maleic acid, fumaric acid, acetylenedicarboxylic acid and itaconic acid. Examples of aliphatic polycarboxylic acids include tricarboxylic acids such as aconitic acid, citric acid and isocitric acid. Examples of aromatic carboxylic acids include aromatic monocarboxylic acids such as benzoic acid, 9-anthracenecarboxylic acid, atrolactic acid, anisic acid, isopropylbenzoic acid, salicylic acid and toluic acid; and aromatic polycarboxylic acids such as phthalic acid, isophthalic acid, terephthalic acid, carboxyphenylacetic acid and pyromellitic acid. Additional other examples include amino acids such as alanine, leucine, threonine, aspartic acid, glutamic acid, arginine, cysteine, methionine, phenylalanine, tryptophane and histidine.

The carboxylic acid is preferably 2-ethylhexanoic acid, octylic acid, neodecanoic acid, oleic acid or naphthenic acid, because particularly these acids are easily available and low in price, and satisfactorily compatible with the (A) component.

When the melting point of the carboxylic acid is high (the crystallinity is high), the metal carboxylate having the acid radical has similarly a high melting point and is hardly handlable (poor in workability). Accordingly, the melting point of the carboxylic acid is preferably 65° C. or less, more preferably −50 to 50° C., and particularly preferably −40 to 35° C.

Additionally, when the number of the carbon atoms in the carboxylic acid is large (the molecular weight of the carboxylic acid concerned is large), the metal carboxylate having the acid radical takes a solid form or a highly viscous liquid form, becoming hardly handlable (degrading the workability thereof). On the contrary, when the number of the carbon atoms in the above described carboxylic acid is small (the molecular weight thereof is small), sometimes the metal carboxylate having the acid radical contains such components that are easily evaporated by heating, and the catalytic activity of the metal carboxylate is degraded. Particularly, under the conditions that the composition is extended thinly (a thin layer), sometimes the evaporation due to heating becomes significant, and the catalytic activity of the metal carboxylate is largely degraded. Accordingly, for the above described carboxylic acid, the number of the carbon atoms inclusive of the carbonyl carbon atom is preferably 2 to 20, more preferably 6 to 17, and particularly preferably 8 to 12.

From the viewpoint of easy handling properties (workability and viscosity) of the metal carboxylate, the metal carboxylate is preferably a metal dicarboxylate or a metal monocarboxylate, and more preferably a metal monocarboxylate.

Additionally, the above described metal carboxylate (B) is preferably a metal carboxylate in which the carbon atom adjacent to the carbonyl group is a tertiary carbon atom (tin 2-ethylhexanoate and the like) or a metal carboxylate in which the carbon atom adjacent to the carbonyl group is a quaternary carbon atom (tin neodecanoate, tin pivalate and the like) because of rapid curing rate, and is particularly preferably a metal carboxylate in which the carbon atom adjacent to the carbonyl group is a quaternary carbon atom. The metal carboxylate in which the carbon atom adjacent to the carbonyl group is a quaternary carbon atom is excellent in the adhesion as compared to other metal carboxylates.

Examples of the carboxylic acid having the acid radical of the metal carboxylate in which the carbon atom adjacent to the carbonyl group is a quaternary carbon atom include chain carboxylic acids represented by the general formula (8):

where $R^8$, $R^9$ and $R^{10}$ each are independently a substituted or unsubstituted monovalent organic group, or may include carboxyl groups; and cyclic carboxylic acids having a structure represented by the general formula (9):

where $R^{11}$ is a substituted or unsubstituted monovalent organic group, $R^{12}$ is a substituted or unsubstituted divalent organic group, and $R^{11}$ and $R^{12}$ may include carboxyl groups, and having a structure represented by the general formula (10):

where $R^{13}$ is a substituted or unsubstituted trivalent organic group and may include carboxyl groups. Specific examples include chain monocarboxylic acids such as pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid, 2,2-dimethyl-3-hydroxypropionic acid; chain dicarboxylic acids such as dimethylmalonic acid, ethylmethylmalonic acid, diethylmalonic acid, 2,2-dimethylsuccinic acid, 2,2-diethylsuccinic acid, 2,2-dimethylglutaric acid; chain tricarboxylic acids such as 3-methylisocitric acid and 4,4-dimethylaconitic acid; cyclic carboxylic acids such as 1-methylcyclopentane carboxylic acid, 1,2,2-trimethyl-1,3-cyclopentane dicarboxylic acid, 1-methylcyclohexane carboxylic acid, 2-methylbicyclo[2.2.1]-5-heptene-2-carboxylic acid, 2-methyl-7-oxabicyclo[2.2.1]-5-heptene-2-carboxylic acid, 1-adamantane carboxylic acid, bicyclo[2.2.1]heptane-1-carboxylic acid and bicyclo[2.2.2]octane-1-carboxylic acid. Compounds having such structures are abundant in natural products, and such compounds can be used.

Metal monocarboxylates are more preferable because the compatibility thereof with the (A) component and the workability thereof are satisfactory; additionally, metal salts of chain monocarboxylic acids are furthermore preferable.

From the above description, as the (B) component to be used in the present invention, specifically tin pivalate, tin neodecanoate, tin versatate, tin 2,2-dimethyloctanoate and tin 2-ethyl-2,5-dimethylhexanoate and bismuth neodecanoate are preferable; and tin neodecanoate, tin versatate, tin 2,2-dimethyloctanoate and tin 2-ethyl-2,5-dimethylhexanoate are more preferable.

The use of such a metal carboxylate as the (B) component in the present invention improves the recovery property, durability and creep resistance of the cured substance of the (A) component organic polymer, and additionally, is effective for the water resistant adhesion, adhesion durability under conditions of high temperatures and high humidities, residual tack, dust sticking property, staining property, surface weather resistance, heat resistance, weather resistant adhesion to glass and adhesion to concrete and the like of the cured substance of the (A) component organic polymer.

The used amount of the (B) component is preferably of the order of 0.01 to 20 parts by weight, and further preferably of the order of 0.5 to 10 parts by weight, in relation to 100 parts by weight of the (A) component. When the blended amount of the (B) component is less than the above described ranges, sometimes the curing rate becomes slow, and the curing reaction tends to hardly proceed to a sufficient extent. On the other hand, when the blended amount of the (B) component exceeds the above described ranges, sometimes the work life becomes too short and the workability tends to be degraded, and the storage stability also tends to be degraded.

Additionally, the above described various metal carboxylates can be used each alone or in combinations of two or more thereof.

In the present invention, a carboxylic acid is used as the (C) component. The carboxylic acid to be used as the (C) component provides an effect to improve the curing activity of the one-part curable composition of the present invention, and moreover, provides an effect of suppressing the curing retardation after storage.

As the (C) component carboxylic acid, there can be cited as examples various carboxylic acids having the acid radicals of the above described metal carboxylates that are the (B) components.

Similarly to the metal carboxylate (B), the carboxylic acid preferably has 2 to 20, more preferably 6 to 17, and particularly preferably 8 to 12 carbon atoms inclusive of the carbonyl carbon atom. From the viewpoint of easy handlability (workability and viscosity) of the carboxylic acid, the carboxylic acid is preferably a dicarboxylic acid or a monocarboxylic acid, and more preferably a monocarboxylic acid. Additionally, because of rapid curing rate, the carboxylic acid is preferably such a carboxylic acid (2-ethylhexanoic acid or the like) in which the carbon atom adjacent to the carbonyl group is a tertiary carbon atom or such a carboxylic acid (neodecanoic acid, pivalic acid or the like) in which the carbon atom adjacent to the carbonyl group is a quaternary carbon atom, and is particularly preferably the carboxylic acid in which the carbon atom adjacent to the carbonyl group is a quaternary carbon atom.

From the viewpoint of availability, curability and workability, as the carboxylic acid, 2-ethylhexanoic acid, neodecanoic acid, versatic acid, 2,2-dimethyloctanoic acid and 2-ethyl-2,5-dimethylhexanoic acid are particularly preferable.

The use of the (C) component carboxylic acid is effective for the recovery property, durability and creep resistance, and additionally, water resistant adhesion, adhesion durability under conditions of high temperatures and high humidities, residual tack, dust sticking property, surface weather resistance, staining property, heat resistance, weather resistant adhesion to glass and adhesion to concrete and the like of the cured substance of the organic polymer that is the (A) component.

The used amount of the (C) component need be smaller in molar quantity than the used amount of the (B) component, and is preferably of the order of 0.01 to 20 parts by weight, and further preferably of the order of 0.5 to 10 parts by weight, in relation to 100 parts by weight of the (A) component. When the blended amount of the (C) component exceeds the above described ranges, sometimes the adhesion is degraded, and the work life becomes too short and the workability is degraded. On the other hand, when the blended amount of the (C) component is less than the above described ranges, sometimes the curing rate becomes slow, and sometimes the curing retardation is caused after storage.

Additionally, the above described carboxylic acids can be used each alone, and also in combinations of two or more thereof.

On the other hand, when the activity is low and an appropriate curability cannot be obtained only with the (B) component metal carboxylate and the (C) component carboxylic acid, the amine compound that is the (D) component can be added as a promoter.

Specific examples of the amine compound of the (D) component include aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine and cyclohexylamine; aliphatic secondary amines such as dimethylamine, diethylamine, dipropylamine, diisopropylamine, dibutylamine, diamylamine, dihexylamine, dioctylamine, bis(2-ethylhexyl)amine, didecylamine, dilaurylamine, dicetylamine, distearylamine, methylstearylamine, ethylstearylamine and butylstearylamine; aliphatic tertiary amines such as triamylamine, trihexylamine and trioctylamine; aliphatic unsaturated amines such as triallylamine and oleylamine; aromatic amines such as laurylaniline, stearylaniline and triphenylamine; and other amines such as monoethanolamine, diethanolamine, triethanolamine, 3-hydroxypropylamine, diethylenetriamine, triethylenetetramine, benzylamine, 3-methoxypropylamine, 3-lauryloxypropylamine, 3-dimethylaminopropylamine, 3-diethylaminopropylamine, xylylenediamine, ethylenediamine, hexamethylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5,4,0)undecene-7 (DBU) and 1,5-diazabicyclo(4,3,0)nonene-5 (DBN). However, the amine (E) is not limited to these examples.

The promoter activity of the (D) component is largely varied depending on the structure of the (D) component itself and the compatibility thereof with the (A) component, and accordingly, it is preferable that an appropriate compound is selected as the (D) component in conformity with the type of the (A) component to be used. When a polyoxyalkylene polymer, for example, is used as the (A) component, primary amines such as octylamine and laurylamine are preferable because these amines are high in promoter activity; additionally, preferable are the amine compounds which each have a hydrocarbon group having at least one hetero atom. Examples of the hetero atom as referred to here include N, O and S atoms, but the hetero atom is not limited to these examples. Examples of such amine compounds include the amines described above under the category of other amines. Among such amines, more preferable are the amine compounds each having a hydrocarbon group having a hetero atom at the carbon atom of at least one position of positions 2 to 4. Examples of such amine compounds include ethylenediamine, ethanolamine, dimethylaminoethylamine, diethylaminoethylamine, 3-hydroxypropylamine, diethylenetriamine, 3-methoxypropylamine, 3-lauryloxypropylamine, N-methyl-1,3-propanediamine, 3-dimethylaminopropylamine, 3-diethylaminopropylamine, 3-(1-piperazinyl)propylamine and 3-morpholinopropylamine. Among these amine compounds, 3-diethylaminopropylamine and 3-morpholinopropylamine are more preferable because these two compounds are high in promoter activity. 3-diethylaminopropylamine is particularly preferable because this compound leads to curable compositions satisfactory in adhesion, workability and storage stability. Additionally, when an isobutylene polymer is used as the (A) component, relatively long chain aliphatic secondary amines such as dioctylamine and distearylamine and aliphatic secondary amines such as dicyclohexylamine are preferable because of the high promoter activity of each of these amines.

The blended amount of the amine compound that is the above (D) component is preferably of the order of 0.01 to 20 parts by weight and more preferably 0.1 to 5 parts by weight in relation to 100 parts by weight of the organic polymer of the (A) component. When the blended amount of the amine compound is less than 0.01 part by weight, sometimes the curing rate becomes slow, and the curing reaction hardly proceeds to a sufficient extent. On the other hand, when the blended amount of the amine compound exceeds 20 parts by weight, sometimes the pot life tends to become too short and the workability is degraded; additionally sometimes the curing rate becomes slow.

As the curing catalyst of the present invention, metal carboxylates are used, and other curing catalysts can be simultaneously used to an extent not to degrade the effect of the present invention. Examples of the curing catalyst include titanium compounds such as tetrabutyl titanate, tetrapropyl titanate, tetrakis(acetylacetonato)titanium and bis(acetylacetonato)diisopropoxy titanium; tetravalent organotin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin bis(acetylacetonate), dibutyltin bis(ethylacetoacetate), a reaction product of dibutyltin oxide and a silicate compound, and a reaction product of dibutyltin oxide and a phthalic acid ester; organoaluminum compounds such as aluminum tris(acetylacetonate), aluminum tris(ethylacetoacetate) and diisopropoxyaluminum ethyl acetoacetate; and zirconium compounds such as zirconium tetrakis (acetylacetonate). Simultaneous use of these curing catalysts increases the catalytic activity, and improves the deep-part curability, thin-layer curability, adhesion and the like. However, an organotin compound, according to the used amount thereof, degrades the recovery property, durability and creep resistance of the cured substance derived from the obtained curable composition.

For the curable composition of the present invention, silicate can be used. The silicate acts as a cross-linking agent, and has functions to improve the recovery property, durability and creep resistance of the organic polymer of the (A) component of the present invention. Moreover, the silicate has effects to improve the adhesion, water resistant adhesion and adhesion durability under conditions of high temperatures and high humidities. As the silicate, tetraalkoxysilane or the partially hydrolyzed condensates thereof can be used. When the silicate is used, the used amount thereof is 0.1 to 20 parts by weight, and preferably 0.5 to 10 parts by weight in relation to 100 parts by weight of the organic polymer of the (A) component.

Specific examples of the silicate include tetraalkoxysilanes(tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane and tetra-t-butoxysilane, and the partially hydrolyzed condensates of these silanes.

The partially hydrolyzed condensates of the tetraalkoxysilanes are more preferable because these condensates are lager in the improvement effect of the recovery property, durability and creep resistance of the present invention than the tetraalkoxysilanes.

Examples of the above described partially hydrolyzed condensate of a tetraalkoxysilane include a condensate obtained by the usual way in which water is added to a tetraalkoxysilane to partially hydrolyze the tetraalkoxysilane and form the condensate. Additionally, partially hydrolyzed condensates of organosilicate compounds are commercially available. Examples of such condensates include Methyl silicate 51 and Ethyl silicate 40 (both manufactured by Colcoat Co., Ltd.).

Filler can be added to the composition of the present invention. Examples of the fillers include reinforcing fillers such as fumed silica, precipitated silica, crystalline silica, fused silica, dolomite, anhydrous silicic acid, hydrous silicic acid and carbon black; fillers such as ground calcium carbonate, precipitated calcium carbonate, magnesium carbonate, diatomite, sintered clay, clay, talc, titanium oxide, bentonite, organic bentonite, ferric oxide, aluminum fine powder, flint powder, zinc oxide, active zinc white, shirasu balloon, glass microballoon, organic microballoons of phenolic resin and vinylidene chloride resin, and resin powders such as PVC powder and PMMA powder; and fibrous fillers such as asbestos, glass fiber and glass filament. When a filler is used, the used amount thereof is 1 to 250 parts by weight, and preferably 10 to 200 parts by weight in relation to 100 parts by weight of the polymer of the (A) component.

When it is desired to obtain a cured substance high in strength by use of these fillers, preferable is a filler mainly selected from fumed silica, precipitated silica, crystalline silica, fused silica, dolomite, anhydrous silicic acid, hydrous silicic acid, carbon black, surface treated fine calcium carbonate, sintered clay, clay and active zinc white; a desirable effect is obtained when such a filler is used within a range from 1 to 200 parts by weight in relation to 100 parts by weight of the organic polymer having a reactive silicon group (A). Additionally, when it is desired to obtain a cured substance low in tensile strength and large in elongation at break, a desirable effect is obtained by use of a filler mainly selected from titanium oxide, calcium carbonate such as ground calcium carbonate, magnesium carbonate, talc, ferric oxide, zinc oxide and shirasu balloon within a range from 5 to 200 parts by weight in relation to 100 parts by weight of the organic polymer having a reactive silicon group (A). It is to be noted that in general, the calcium carbonate exhibits, with increasing specific surface area value thereof, an increasing improvement effect of the tensile strength at break, elongation at break and adhesion of the cured substance. Needless to say, these fillers may be used either each alone or in admixtures of two or more thereof. When calcium carbonate is used, it is desirable to use surface treated fine calcium carbonate in combination with calcium carbonate larger in particle size such as ground calcium carbonate. The particle size of surface treated fine calcium carbonate is preferably 0.5 µm or less, and the surface treatment is preferably carried out by treating with a fatty acid or a fatty acid salt. The calcium carbonate larger in particle size is preferably 1 μm or more in particle size, and can be used without being subjected to surface treatment.

For the purpose of improving the workability (cutting property, etc.) of the composition and deglossing the surface of the cured substance, organic balloons and inorganic balloons are preferably added. Such fillers can be subjected to surface treatment, and may be used each alone or can be used in admixtures of two or more thereof. For the purpose of improving the workability (cutting property, etc.), the particle sizes of these balloons are preferably 0.1 mm or less. For the purpose of deglossing the surface of the cured substance, the particle sizes are preferably 5 to 300 μm.

On the grounds that the cured substance of the composition of the present invention is satisfactory in chemical resistance and the like, the composition of present invention is suitably used for joints of housing exterior wall such as sizing boards, in particular, ceramic sizing boards, for a adhesive for exterior wall tiles, for a adhesive for exterior wall tiles remaining in the joints and for the like purposes; in this connection, it is desirable that the design of the exterior wall and the design of the sealant are in harmony with each other. Particularly, posh exterior walls have come to be used by virtue of sputter coating and mixing colored aggregates. When the composition of the present invention is blended with a scale-like or granulated material having a diameter of 0.1 mm or more, preferably of the order of 0.1 to 5.0 mm, the cured substance comes to be in harmony with such posh exterior walls, and is excellent in chemical resistance, so that the composition concerned comes to be an excellent composition in the sense that the exterior appearance of the cured substance remains unchanged over a long period of time. Use of a granulated material provides a dispersed sand-like or sandstone-like surface with a rough texture, while use of a scale-like material provides an irregular surface based on the scale-like shape of the material.

The preferable diameter, blended amount and materials for the scale-like or granulated material are described in Japanese Patent Laid-Open No. 9-53063 as follows.

The diameter is 0.1 mm or more, preferably of the order of 0.1 to 5.0 mm, and there is used a material having an appropriate size in conformity with the material quality and pattern of exterior wall. Materials having a diameter of the order of 0.2 mm to 5.0 mm and materials having a diameter of the order of 0.5 mm to 5.0 mm can also be used. In the case of a scale-like material, the thickness is set to be as thin as the order of 1/10 to 1/5 the diameter (the order of 0.01 to 1.00 mm). The scale-like or granulated material is transported to the construction site as a sealant in a condition that the material is beforehand mixed in the main component of the sealant, or is mixed in the main component of the sealant at the construction site when the sealant is used.

The scale-like or granulated material is blended in a content of the order of 1 to 200 parts by weight in relation to 100 parts by weight of a composition such as a sealant composition and an adhesive composition. The blended amount is appropriately selected depending on the size of the scale-like or granulated material, and the material quality and pattern of exterior wall.

As the scale-like or granulated material, natural products such as silica sand and mica, synthetic rubbers, synthetic resins and inorganic substances such as alumina are used. The material is colored in an appropriate color so as to match the material quality and pattern of exterior wall to heighten the design quality when filled in the joints.

A preferable finishing method and the like are described in Japanese Patent Laid-Open No. 9-53063.

Additionally, when a balloon (preferably the mean particle size thereof is 0.1 mm or more) is used for a similar purpose, the surface is formed to have a dispersed sand-like or sandstone-like surface with a rough texture, and a reduction of weight can be achieved. The preferable diameter, blended amount and materials for the balloon are described in Japanese Patent Laid-Open No. 10-251618 as follows.

The balloon is a sphere-shaped material with a hollow interior. Examples of the material for such a balloon include inorganic based materials such as glass, shirasu and silica; and organic based materials such as phenolic resin, urea resin, polystyrene and Saran™; however, the material concerned is not limited to these examples; an inorganic based material and an organic based material can be compounded, or can be laminated to form multiple layers. An inorganic based balloon, an organic based balloon, a balloon made of a compounded inorganic-organic material or the like can be used. Additionally, as a balloon to be used, either a type of balloon or an admixture of multiple types of balloons can be used. Moreover, a balloon with the processed surface thereof or with the coated surface thereof can be used, and additionally, a balloon with the surface thereof subjected to treatment with various surface treatment agents can also be used. More specifically, examples are included in which an organic based balloon is coated with calcium carbonate, talc, titanium oxide and the like, and an inorganic based balloon is subjected to surface treatment with a silane coupling agent.

For the purpose of obtaining a dispersed sand-like or sandstone-like surface with a rough texture, the particle size of the balloon is preferably 0.1 mm or more. A balloon of a particle size of the order of 0.2 mm to 5.0 mm or a balloon of a particle size of the order of 0.5 mm to 5.0 mm can also be used. Use of a balloon of a particle size of less than 0.1 mm sometimes only increases the viscosity of the composition, and yields no rough texture, even when the used amount of the balloon is large. The blended amount of the balloon can be easily determined in conformity with the desired degree of the dispersed sand-like or sandstone-like rough texture. Usually, it is desirable that a balloon of 0.1 mm or more in particle size is blended in a ratio of 5 to 25 vol % in terms of the volume concentration in the composition. When the volume concentration of the balloon is less than 5 vol %, no rough texture can be obtained, while when the volume concentration of the balloon exceeds 25 vol %, the viscosity of the sealant and that of the adhesive tend to become high to degrade the workability, and the modulus of the cured substance becomes high, so that the basic performance of the sealant and that of the adhesive tend to be impaired. The preferable volume concentration to balance with the basic performance of the sealant is 8 to 22 vol %.

When a balloon is used, there can be added an antislip agent described in Japanese Patent Laid-Open No. 2000-154368 and an amine compound to make irregular and degloss the surface of the cured substance described in Japanese Patent Laid-Open No. 2001-164237, in particular, a primary amine and/or a secondary amine having a melting point of 35° C. or higher.

Specific examples of the balloon are described in the following publications: Japanese Patent Laid-Open Nos. 2-129262, 4-8788, 4-173867, 5-1225, 7-113073, 9-53063, 10-251618, 2000-154368 and 2001-164237, and WO97/05201.

When the composition of the present invention includes the particles of the cured substance derived from a sealant, the cured substance can make irregularities on the surface to improve the design quality. The preferable diameter, blended amount and materials of the cured substance particle material derived from a sealant is described in Japanese Patent Laid-Open No. 2001-115142 as follows. The diameter is preferably of the order of 0.1 mm to 1 mm, and further preferably of the order of 0.2 to 0.5 mm. The blended amount is preferably 5 to 100 wt %, and further preferably 20 to 50 wt % in the curable composition. Examples of the materials include urethane resin, silicone, modified silicone and polysulfide rubber. No constraint is imposed on the materials as long as the materials can be used as sealants; however, modified silicone based sealants are preferable.

A plasticizer can be added to the composition of the present invention. Addition of a plasticizer makes it possible to adjust the viscosity and slump property of the curable composition and the mechanical properties such as tensile strength and elongation of the cured substance obtained by curing the composition. Examples of the plasticizer include phthalates such as dibutyl phthalate, diheptyl phthalate, bis(2-ethylhexyl)phthalate and butyl benzyl phthalate; non-aroamtic dibasic acid esters such as dioctyl adipate, dioctyl sebacate, dibutyl sebacate and diisodecyl succinate; aliphatic esters such as butyl oleate and methyl acetylrecinoleate; phosphates such as tricresyl phosphate and tributyl phosphate; trimellitates; chlorinated parafins; hydrocarbon based oils such as alkyldiphenyls and partially hydrogenated terphenyls; process oils; epoxy plasticizer such as epoxidized soybean oil and benzyl epoxystearate.

Additionally, a polymer plasticizer can be used. When a polymer plasticizer is used, the initial physical properties are maintained over a longer period of time than when a low molecular weight plasticizer is used which is a plasticizer containing no polymer component. Moreover, the drying property (also referred to as coating property) can be improved when an alkyd coating material is applied onto the cured substance concerned. Examples of the polymer plasticizer include vinyl polymers obtained by polymerizing vinyl monomers by means of various methods; polyalkylene glycol esters such as diethylene glycol dibenzoate, triethylene glycol dibenzoate, pentaerithritol ester; polyester based plasticizers obtained from dibasic acids such as sebacic acid, adipic acid, azelaic acid and phthalic acid and dihydric alcohols such as ethylene glycol, diethylene glycol, triethylene glycol, propylene glycol and dipropylene glycol; polyethers including polyether polyols each having a molecular weight of 500 or more, additionally 1000 or more such as polyethylene glycol, polyprolylene glycol and polytetramethylene glycol, and the derivatives of these polyether polyols in which the hydroxy groups in these polyether polyols are substituted with ester groups, ether groups and the like; polystyrenes such as polystyrene and poly-α-methylstyrene; and polybutadiene, polybutene, polyisobutylene, butadiene-acrylonitrile and polychloroprene. However, the polymer plasticizer concerned is not limited to these examples.

Of these polymer plasticizers, those polymer plasticizers which are compatible with the polymer of the (A) component are preferable. In this regard, polyethers and vinyl polymers are preferable. Additionally, the use of polyethers as plasticizers improves the surface curability and deep part curability, and causes no curing retardation after storage, and hence polyethers are preferable; of polyethers, polypropylene glycol is more preferable. Additionally, from the viewpoint of the compatibility, weather resistance and heat resistance, vinyl polymers are preferable. Of the vinyl polymers, acryl polymers and/or methacryl polymers are preferable, and acryl polymers such as polyalkylacrylate are further preferable. As the polymerization method to produce acryl polymers, the living radical polymerization method is preferable because this method can lead to narrow molecular weight distributions and low viscosities, and the atom transfer radical polymerization method is further preferable. Additionally, it is preferable to use a polymer based on the so-called SGO process which is obtained by continuously block polymerizing of an alkyl acrylate monomer at a high temperature and under a high pressure, as described in Japanese Patent Laid-Open No. 2001-207157.

The number average molecular weight of the polymer plasticizer is preferably 500 to 15000, more preferably 800 to 10000, further preferably 1000 to 8000, particularly preferably 1000 to 5000, and most preferably 1000 to 3000. When the molecular weight is too low, the plasticizer is removed with time thermally and by rainfall, and hence it is made impossible to maintain the initial physical properties over a long period of time, and the coating property with the alkyd coating cannot be improved. On the other hand, when the molecular weight is too high, the viscosity becomes high and the workability is degraded. No particular constraint is imposed on the molecular weight distribution of the polymer plasticizer. However, it is preferable that the molecular weight distribution is narrow; the molecular weight distribution is preferably less than 1.80, more preferably 1.70 or less, further preferably 1.60 or less, yet further preferably 1.50 or less, particularly preferably 1.40 or less and most preferably 1.30 or less.

The number average molecular weight of a vinyl polymer is measured with the GPC method, and that of a polyether polymer is measured with the terminal group analysis method. Additionally, the molecular weight distribution (Mw/Mn) is measured with the GPC method (relative to polystyrene standard).

Additionally, the polymer plasticizer either may have no reactive silicon group or may have a reactive silicon group. When the polymer plasticizer have a reactive silicon group, the polymer plasticizer acts as a reactive plasticizer, and can prevent the migration of the plasticizer from the cured substance. When the polymer plasticizer has a reactive silicon group, the average number of the reactive silicon group per molecule is 1 or less, and preferably 0.8 or less. When the reactive silicon group-containing plasticizer, in particular, a reactive silicon group-containing oxyalkylene polymer is used, it is necessary that the number average molecular weight thereof is lower than that of the polymer of the (A) component.

The plasticizers may be used either each alone or in combinations of two or more thereof. Additionally, a low molecular weight plasticizer and a polymer plasticizer may be used in combination. It is to be noted that these plasticizers can also be blended when the polymer is produced.

The used amount of the plasticizer is 5 to 150 parts by weight, preferably 10 to 120 parts by weight, and further preferably 20 to 100 parts by weight, in relation to 100 parts by weight of the polymer of the (A) component. When the used amount is less than 5 parts by weight, the effect as the plasticizer is not exhibited, while when the used amount exceeds 150 parts by weight, the mechanical strength of the cured substance is insufficient.

To the composition of the present invention, a silane coupling agent, a reaction product of the silane coupling agent or a compound other than the silane coupling agent can be added as an adhesion-imparting agent. Specific examples of the silane coupling agent include isocyanate group-containing silanes such as γ-isocyanatepropyltrimethoxysilane, γ-isocyanatepropyltriethoxysilane, γ-isocyanatepropylmethyldiethoxysilane and γ-isocyanatepropyl methyldimethoxysilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis(2-methoxyethoxy)silane and N-β-(carboxymethyl)aminoethyl-γ-aminopropyltrimethoxysilane; vinyl-type unsaturated group-containing silanes such as vinyltrimethoxysilane, vinyltriethoxysilane, γ-methacryloyloxypropylmethyldimethoxysilane and γ-acryloyloxypropylmethyltriethoxysilane; halogen-containing silanes such as γ-chloropropyltrimethoxysilane; and isocyanurate silanes such as tris(trimethoxysilyl)isocyanurate. Additionally, the following derivatives obtained by modifying these compounds can be used as silane coupling agents: amino-modified silylpolymer, silylated aminopolymer, unsaturated aminosilane complex, phenylamino-long chain alkylsilane, aminosilylated silicone and silylated polyester. The silane coupling agent used in the present invention is usually used within a range from 0.1 to 20 parts by weight in relation to 100 parts by weight of the organic polymer having a reactive silicon group (A). Particularly, it is preferable to use the silane coupling agent within a range from 0.5 to 10 parts by weight.

The effect of the silane coupling agent added to the curable composition of the present invention is such that the silane coupling agent exhibits marked adhesion improvement effect under either non-primer conditions or primer-treatment conditions for various types of adherends, namely, inorganic substrates made of glass, aluminum, stainless steel, zinc, copper and mortar and organic substrates made of polyvinyl chloride, acrylic resin, polyester, polyethylene, polypropylene and polycarbonate. When the silane coupling agent is added under non-primer conditions, improvement effect of adhesion to various adherends is particularly remarkable.

No particular constraint is imposed on the adhesion-imparting agents other than the above described silane coupling agents, and specific examples of such adhesion-imparting agents include epoxy resin, phenolic resin, sulfur, alkyl titanates and aromatic polyisocyanates. The adhesion-imparting agents may be used either each alone or in admixtures of two or more thereof. Addition of these adhesion-imparting agents can improve the adhesion to adherends.

To the curable composition of the present invention, according to need, there may be added a physical property regulator to regulate the tensile strength of the produced cured substance. No particular constraint is imposed on the physical property regulator. However, examples of the physical property regulator include alkylalkoxysilanes such as methyltrimethoxysilane, dimethyldimethoxysilane, trimethylmethoxysilane and n-propyltrimethoxysilane; alkoxysilanes having functional groups such as alkylisopropenoxy silanes including dimethyldiisopropenoxysilane, methyltriisopropenoxysilane, γ-glycidoxypropylmethyldiisopropenoxysilane, and γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; and polysiloxanes. The use of the physical property regulator makes it possible to increase the hardness obtained when the composition of the present invention is cured, or to decrease the hardness to display the elongation at break. The above described physical property regulators may be used either each alone or in combinations of two or more thereof.

It is to be noted that a compound to hydrolytically produce a compound having a monovalent silanol group in the molecule thereof has an effect to decrease the modulus of the cured substance without degrading the stickiness of the surface of the cured substance. Particularly, a compound to produce trimethylsilanol is preferable. Examples of the compound to hydrolytically produce a compound having a monovalent silanol group in the molecule thereof include a compound described in Japanese Patent Laid-Open No. 5-117521. Additionally, examples of such a compound include a compound which is a derivative of an alkyl alcohol such as hexanol, octanol or decanol, and produces a silicon compound to hydrolytically produce $R_3SiOH$ such as trimethylsilanol, and a compound described in Japanese Patent Laid-Open No. 11-241029 which is a derivative of a polyhydric alcohol having three or more hydroxy groups such as trimethylolpropane, glycerin, pentaerythritol or sorbitol, and produces a silicon compound to hydrolytically produce $R_3SiOH$ such as trimethylsilanol.

Additionally, there can be cited such a compound as described in Japanese Patent Laid-Open No. 7-258534 which is a derivative of oxypropylene polymer and produces a silicon compound to hydrolytically produce $R_3SiOH$ such as trimethylsilanol. Moreover, there can be used a polymer described in Japanese Patent Laid-Open No. 6-279693 which contains a hydrolyzable silicon containing group capable of cross linking and a silicon containing group capable of hydrolytically forming a monosilanol containing compound.

The physical property regulator is used within a range from 0.1 to 20 parts by weight, and preferably from 0.5 to 10 parts by weight, in relation to 100 parts by weight of the organic polymer having a reactive silicon group (A).

To the curable composition of the present invention, according to need, a thixotropy providing agent (antisagging agent) may be added for the purpose of preventing sagging and improving workability. No particular constraint is imposed on the antisagging agent; however, examples of the antisagging agent include polyamide waxes; hydrogenated castor oil derivatives; and metal soaps such as calcium stearate, aluminum stearate and barium stearate. These thixotropy providing agents (antisagging agents) may be used either each alone or in combinations of two or more thereof.

The tixotropy providing agents each are used within a range from 0.1 to 20 parts by weight in relation to 100 parts by weight of the organic polymer having a reactive silicon group (A).

In the composition of the present invention, a compound can be used which contains an epoxy group in one molecule. Use of an epoxy group-containing compound can increase the recovery property of the cured substance. Examples of the epoxy group-containing compound include compounds such as epoxidized unsaturated oils and fats, epoxidized unsaturated fatty acid esters, alicyclic epoxy compounds and epichlorohydrin derivatives, and admixtures of these compounds. More specific examples include epoxidized soybean oil, epoxidized flaxseed oil, bis(2-ethylhexyl)-4,5-epoxycyclohexane-1,2-dicarboxylate (E-PS), epoxyoctyl stearate and epoxybutyl stearate. Of these, E-PS is particularly preferable. It is recommended that these epoxy group containing compounds each are used within a range from 0.5 to 50 parts by weight in relation to 100 parts by weight of the organic polymer having a reactive silicon group (A).

For the composition of the present invention, a photocuring substance can be used. Use of a photocuring substance forms a coating film of the photocuring substance on the surface of the cured substance to improve the stickiness and the weather resistance of the cured substance. A photocuring substance means a substance which undergoes a chemical change, caused by action of light, of the molecular structure thereof in a fairly short time to result in changes of the physical properties such as curing. Among such a large number of compounds known are organic monomers, oligomers, resins and compositions containing these substances, and any commercially available substances concerned can optionally be adopted. As representative photocuring substances, unsaturated acryl compounds, polyvinyl cinnamates and azidized resins and the like can be used. The unsaturated acryl compounds are monomers, oligomers and admixtures of the monomers and the oligomers, the monomers and oligomers each having one or a few acryl or methacryl based unsaturated groups; examples of the unsaturated acryl compounds include monomers such as propylene (or butylene, or ethylene)glycol di(meth)acrylate and neopentylglycol di(meth)acrylate, and oligoesters of 10,000 or less in molecular weight related to these monomers. Specific examples include special acrylates (bifunctional) such as ARONIX M-210, ARONIX M-215, ARONIX M-220, ARONIX M-233, ARONIX M-240 and ARONIX M-245; special acrylates (trifunctional) such as ARONIX M-305, ARONIX M-309, ARONIX M-310, ARONIX M-315, ARONIX M-320 and ARONIX M-325; and special acrylates (multifunctional) such as ARONIX M-400. Those compounds which each have acrylic functional groups are particularly preferable, and additionally, those compounds which each have, on average, three or more acrylic functional groups in one molecule are preferable. (all the aforementioned ARONIXs are the products of Toagosei Co., Ltd.)

Examples of the polyvinyl cinnamates include photosensitive resins having cinnamoyl groups as photosensitive groups, namely, those compounds obtained by esterification of polyvinyl alcohol with cinnamic acid; and additionally, a large number of derivatives of polyvinyl cinnamates. Azidized resins are known as photosensitive resins having azide groups as photosensitive groups; common examples of the azidized resins include a rubber photosensitive solution added with an azide compound as photosensitive agent, and additionally, those compounds detailed in "photosensitive resins" (published by Insatu Gakkai Shuppanbu, Mar. 17, 1972, p. 93, p. 106 and p. 117); and these compounds can be used each alone or in admixtures thereof, and in combination with sensitizers to be added according to need. It is to be noted that addition of sensitizers such as ketones and nitro compounds and accelerators such as amines sometimes enhances the effect. It is recommended that the photocuring substance is used within a range from 0.1 to 20 parts by weight and preferably from 0.5 to 10 parts by weight in relation to 100 parts by weight of the organic polymer having a reactive silicon group (A); when the content of the photocuring substance is less than 0.1 part by weight, no effect to increase the weather resistance is displayed, while when the content exceeds 20 parts by weight, the cured substance tends to be too hard and cracked.

For the composition of the present invention, an oxygen-curable substance can be used. Examples of the oxygen-curable substance include unsaturated compounds reactable with the oxygen in the air, which react with the oxygen in the air and form a cured coating film around the surface of the cured substance to act to prevent the surface stickiness and the sticking of dust and grime to the surface of the cured substance and to do the like. Specific examples of the oxygen-curable substance include drying oils represented by wood oil, flaxseed oil and the like and various alkyd resins obtained by modifying these compounds; acryl polymers, epoxy based resins and silicon resins all modified with drying oils; liquid polymers such as 1,2-polybutadiene and 1,4-polybutadiene obtained by polymerizing or copolymerizing diene compounds such as butadiene, chloroprene, isoprene, 1,3-pentadiene, and polymers derived from C5 to C8 dienes, liquid copolymers such as NBR, SBR and the like obtained by copolymerizing these diene compounds with monomers such as acrylonitrile, styrene and the like having copolymerizability so as for the diene compounds to dominate, and various modified substance of these compounds (maleinized modified substances, boiled oil-modified substances, and the like). These substances can be used either each alone or in combinations of two or more thereof. Of these substances, wood oil and liquid diene polymers are particularly preferable. Additionally, in some cases, when catalysts to accelerate the oxidation curing reaction and metal dryers are used in combination with these substances, the effect is enhanced. Examples of these catalysts and metal dryers include metal salts such as cobalt naphtenate, lead naphthenate, zirconium naphthenate, cobalt octylate and zirconium octylate; and amine compounds. The used amount of the oxygen-curing substance is recommended such that the oxygen-curing substance is used within a range from 0.1 to 20 parts by weight and further preferably from 0.5 to 10 parts by weight in relation to 100 parts by weight of the organic polymer having a reactive silicon group (A); when the used amount is less than 0.1 part by weight, improvement of staining property becomes insufficient, while when the used amount exceeds 20 parts by weight, the tensile property and the like of the cured substance tends to be impaired. It is recommended that the oxygen-curing substance is used in combination with a photocuring substance as described in Japanese Patent Laid-Open No. 3-160053.

For the composition of the present invention, an antioxidant (antiaging agent) can be used. Use of an antioxidant can increase the heat resistance of the cured substance. Examples of the antioxidant can include hindered phenol based antioxidants, monophenol based antioxidants, bisphenol based antioxidants and polyphenol based antioxidants, hindered phenol based antioxidants being particularly preferable. Similarly, the following hindered amine based photostabilizers can also be used: TINUVIN 622LD, TINUVIN 144; CHIMASSORB944LD and CHIMASSORB119FL (all manufactured by Ciba-Geigy Japan Ltd.); MARK LA-57, MARK LA-62, MARK LA-67, MARK LA-63 and MARK LA-68 (all manufactured by Adeka Argus Chemical Co., Ltd.); and SANOL LS-770, SANOL LS-765, SANOL LS-292, SANOL LS-2626, SANOL LS-1114 and SANOL LS-744 (all manufactured by Sankyo Co., Ltd.). Specific examples of the antioxidants are described also in Japanese Patent Laid-Open Nos. 4-283259 and 9-194731. The used amount of the antioxidant is recommended such that the antioxidant is used within a range from 0.1 to 10 parts by weight and further preferably from 0.2 to 5 parts by weight in relation to 100 parts by weight of the organic polymer having a reactive silicon group (A).

For the composition of the present invention, a photostabilizer can be used. Use of a photostabilizer can prevent the photooxidation degradation of the cured substance. Examples of the photostabilizer include benzotriazole compounds, hindered amine compounds, benzoate compounds and the like; hindered amine compounds are particularly preferable. The used amount of the photostabilizer is recommended such that the photostabilizer is used within a range from 0.1 to 10 parts by weight and further preferably from 0.2 to 5 parts by weight in relation to 100 parts by weight of the organic polymer having a reactive silicon group (A). Specific examples of the photostabilizer are described in Japanese Patent Laid-Open No. 9-194731.

When the photocuring substance is used for the composition of the present invention, in particular, when an unsaturated acryl compound is used, it is preferable to use a tertiary amine-containing hindered amine based photostabilizer as a hindered amine based photostabilizer as described in Japanese Patent Laid-Open No. 5-70531 for the purpose of improving the storage stability of the composition. Examples of the tertiary amine-containing hindered amine based photostabilizer include TINUVIN 622LD, TINUVIN 144 and CHIMASSORB119FL (all manufactured by Ciba-Geigy Japan Ltd.); MARK LA-57, LA-62, LA-67 and LA-63 (all manufactured by Adeka Argus Chemical Co., Ltd.); and SANOL LS-765, SANOL LS-292, SANOL LS-2626, SANOL LS-1114 and SANOL LS-744 (all manufactured by Sankyo Co., Ltd.).

For the composition of the present invention, an ultraviolet absorber can be used. Use of an ultraviolet absorber can increase the surface weather resistance of the cured substance. Examples of the ultraviolet absorber include benzophenone compounds, benzotriazole compounds, salicylate compounds, substituted tolyl compounds and metal chelate compounds; benzotriazole compounds are particularly preferable. The used amount of the ultraviolet absorber is such that the ultraviolet absorber is used within a range from 0.1 to 10 parts by weight, and further preferably from 0.2 to 5 parts by weight in relation to 100 parts by weight of the organic polymer having a reactive silicon group (A). It is preferable that a phenol based antioxidant, a hindered phenol based antioxidant, a hindered amine based photostabilizer and a benzotriazole based ultraviolet absorber are used in combination.

To the composition of the present invention, an epoxy resin can be added. The composition added with an epoxy resin is particularly preferable as an adhesive, in particular, an adhesive for exterior wall tile. Examples of the epoxy resin include epichlorohydrin-bisphenol A-type epoxy resins, epichlorohydrin-bisphenol F-type epoxy resins, flame resistant epoxy resins such as glycidyl ether of tetrabromobisphenol A, novolac-type epoxy resins, hydrogenated bisphenol A-type epoxy resins, epoxy resins of the type of glycidyl ether of bisphenol A propyleneoxide adduct, p-oxybenzoic acid glycidyl ether ester-type epoxy resins, m-aminophenol based epoxy resins, diaminodiphenylmethane based epoxy resins, urethane modified epoxy resins, various alicyclic epoxy resins, N,N-diglycidylaniline, N,N-diglycidyl-o-toluidine, triglycidyl isocyanurate, polyalkylene glycol diglycidyl ether, glycidyl ethers of polyhydric alcohols such as glycerin, hydantoin-type epoxy resins and epoxidized substances of unsaturated polymers such as petroleum resins; however the epoxy resin is not limited to these examples, and commonly used epoxy resins can be used. Epoxy resins having at least two epoxy groups in one molecule are preferable because such compositions are high in reactivity when curing is made, and the cured substances can easily form three dimensional networks. Examples of further preferable epoxy resins include bisphenol A-type epoxy resins or novolac-type epoxy resins. The ratio of the used amount of each of these epoxy resins to the used amount of the organic polymer having a reactive silicon group (A) falls, in terms of weight ratio, in the range such that (A)/epoxy resin=100/1 to 1/100. When the ratio of (A)/epoxy resin is less than 1/100, the effect of improving the impact strength and the toughness of the cured substance of the epoxy resin becomes hardly obtainable, while when the ratio of (A)/epoxy resin exceeds 100/1, the strength of the cured substance of the organic polymer becomes insufficient. The preferable ratio of the used amounts is varied depending on the application of the curable resin composition and hence cannot be unconditionally determined; for example, when the impact resistance, flexibility, toughness, and peel strength and the like of the cured substance of the epoxy resin are to be improved, it is recommended that in relation to 100 parts by weight of the epoxy resin, 1 to 100 parts by weight of the (A) component, further preferably 5 to 100 parts by weight of the (A) component is used. On the other hand, when the strength of the cured substance of the (A) component is to be improved, it is recommended that in relation to 100 parts of the (A) component, 1 to 200 parts by weight of the epoxy resin, further preferably 5 to 100 parts by weight of the epoxy resin is used.

When the epoxy resin is added, as a matter of course, a curing agent to cure the epoxy resin can be applied together to the composition of the present invention. No particular constraint is imposed on the usable epoxy resin curing agent, and commonly used epoxy resin curing agents can be used. Specific examples of the epoxy resin curing agent include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and polyether with amine terminal groups; tertiary amines such as 2,4,6-tris(dimethylaminomethyl)phenol and tripropylamine, and salts of the tertiary amines; polyamide resins; imidazoles; dicyandiamides; borontrifluoride complexes; carboxylic anhydrides such as phthalic anhydride, hexahydrophthalic anhydride, tetrahydrophthalic anhydride, dodecynylsuccinic anhydride, pyromellitic anhydride and chlorendic anhydride; alcohols; phenols; carboxylic acids; and diketone complexes of aluminum and zirconium. However, the epoxy resin curing agent is not limited to these examples. Additionally, the curing agents may be used either each alone or in combinations of two or more thereof.

When an epoxy resin curing agent is used, the used amount thereof falls within a range from 0.1 to 300 parts by weight in relation to 100 parts by weight of the epoxy resin.

As an epoxy resin curing agent, a ketimine can be used. A ketimine is stable when no moisture is present, but moisture decomposes the ketimine into a primary amine and a ketone; the thus produced primary amine acts as a room temperature curable curing agent to cure the epoxy resin. Use of a ketimine makes it possible to obtain a one-part composition. Such a ketimine can be obtained by condensation reaction between an amine compound and a carbonyl compound.

For the synthesis of a ketimine, an amine compound and a carbonyl compound well known in the art can be used. For example, the following compounds can be used as such an amine compound: diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine and p,p'-biphenylenediamine; polyvalent amines such as 1,2,3-triaminopropane, triaminobenzene, tris(2-aminoethyl)amine and tetra(aminomethyl)methane; polyalkylenepolyamines such as diethylenetriamine, triethylenetriamine and tetraethylenepentamine; polyoxyalkylene based polyamines; and aminosilanes such as γ-aminopropyltriethoxysilane, N-(β-aminoethyl)-γ-aminopropyltrimethoxysilane and N-(β-aminoethyl)-γ-aminopropylmethyldimethoxysilane. Additionally, the following compounds can be used as such a carbonyl compound: aldehydes such as acetoaldehyde, propionaldehyde, n-butylaldehyde, isobutylaldehyde, diethylacetoaldehyde, glyoxal and benzaldehyde; cyclic ketones such as cyclopentanone, trimethylcyclopentanone, cyclohexanone and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone and diisobutyl ketone; and β-dicarbonyl compounds such as acetylacetone, methyl acetoacetate, ethyl acetoacetate, dimethyl malonate, diethyl malonate, methyl ethyl malonate and dibenzoylmethane.

When an imino group is present in the ketimine, the imino group can be reacted with styrene oxide; glycidyl ethers such as butyl glycidyl ether and allyl glycidyl ether; and glycidyl esters. These ketimines may be used either each alone or in combinations of two or more thereof; these ketimines each used within a range of 1 to 100 parts by weight in relation to 100 parts by weight of the epoxy resin, the used amount of each of the ketimines is varied depending on the type of the epoxy resin and the type of the ketimine.

To the curable composition of the present invention, various additives can be added according to need for the purpose of regulating the physical properties of the curable composition or the cured substance. Examples of such additives include flame retardants, curing regulators, radical inhibitors, metal deactivators, antiozonants, phosphorus based peroxide decomposers, lubricants, pigments, foaming agents, solvents and mildewproofing agents. These various additives may be used either each alone or in combinations of two or more thereof. Specific additive examples other than the specific examples cited in the present specification are described, for example, in Japanese Patent Publication Nos. 4-69659 and 7-108928, Japanese Patent Laid-Open Nos. 63-254149, 64-22904, 2001-72854 and the like.

In the method for preparing a one-part curable composition of the present invention, since all the blended components are blended together beforehand, it is preferable that the blended components containing moisture are used after dehydrating and drying, or the components are dehydrated by reducing pressure or the like while being kneaded for blending. As for the methods of dehydration and drying, a thermal drying method is suitable for a powdery solid substance or the like, while a reduced pressure dehydration method or a dehydration method which uses a synthetic zeolite, active alumina or silica gel is suitable for a liquid substance. Additionally, there can be adopted a method in which a small amount of an isocyanate compound is added to make its isocyanate group react with water for dehydration. In addition to these dehydration and drying methods, addition of the following compounds further improves the storage stability: lower alcohols such as methanol and ethanol; and alkoxysilane compounds such as n-propyltrimethoxysilane, vinyltrimethoxysilane, vinylmethyldimethoxysilane, γ-mercaptopropylmethyldimethoxysilane, γ-mercaptopropylmethyldiethoxysilane and γ-glycidoxypropyltrimethoxysilane.

It is preferable that the used amount of a dehydrating agent, in particular, a silicon compound capable of reacting with water such as vinyltrimethoxysilane falls within a range from 0.1 to 20 parts by weight, and preferably 0.5 to 10 parts by weight in relation to 100 parts by weight of the organic polymer having a reactive silicon group (A).

In a specific method for preparing, (A) an organic polymer having at least one silicon-containing group capable of cross-linking by forming siloxane bonds, (B) a metal carboxylate, (C) a carboxylic acid, and other additives are mixed together with a mixer, a roll, a kneader or the like; thereafter, the mixture thus obtained is subjected to a dehydration step such as a dehydration by heating or under reduced pressure to yield a one-part curable composition which has been completely dehydrated to such an extent that the water content is decreased to a substantially negligible level; and the one-part curable composition thus treated is stored in a sealed moistureproof container.

The thus obtained one-part curable composition of the present invention exhibits no progress of curing during the period of storage; when the composition is taken out from the container to be exposed to the atmospheric moisture, three dimensional networks are formed to rapidly cure the composition from the surface thereof and thus the composition is cured into a solid matter having a rubber-like elasticity.

The curable composition of the present invention can be used as tackifiers, sealants for buildings, ships, vehicles and road, adhesives, mold forming materials, vibration proof material, dumping materials, soundproof materials, foaming materials, coating materials, spraying materials and the like. Additionally, the curable composition of the present invention can be used in various applications as liquid sealants to be used in materials for electric and electronic components such as backside sealants for solar cells, electric insulating materials such as insulating coating materials for use in electric wire and cable, elastic adhesives, powdery coating materials, casting materials, medical rubber materials, medical adhesives, medical instrument sealants, food packaging materials, sealants for joints in exterior materials such as sizing boards, coating materials, primers, electromagnetic wave shielding conductive materials, heat conducting materials, hot melt materials, electric and electronic potting agents, films, gaskets, various molding materials, antirust and waterproof sealants for edges (cut portions) of wire glass and laminated glass, vehicle components, electric appliance components, various machinery components and the like. Moreover, the curable composition of the present invention can adhere alone or in combination with a primer to a wide variety of substrates including glass, porcelain, woods, metals and molded resin articles, and accordingly, can be used as various types of sealing and adhesive compositions. Additionally, the curable composition of the present invention is excellent in recovery property, durability and creep property, and hence is particularly preferable when used as adhesives for interior panels, adhesive for exterior panels, adhesives for tiling, adhesives for stone tiling, adhesives for finishing ceiling, adhesives for finishing floor, adhesives for finishing wall, adhesives for vehicle panels, adhesives for assembling electric, electronic and precision instruments, sealants for direct glazing, sealants for double glazing, sealants for the SSG technique and sealants for working joints of buildings.

BEST MODE FOR CARRYING OUT THE INVENTION

In the next place, the present invention is specifically described on the basis of examples and comparative examples, but the present invention is not limited by these examples and comparative examples.

SYNTHESIS EXAMPLE 1

By use of a 1/1 (weight ratio) mixture of a polyoxypropylene diol having a molecular weight of about 2,000 and a polyoxypropylene triol having a molecular weight of about 3,000 as an initiator and zinc hexacyanocobaltate-glyme complex as a catalyst, polymerization of propylene oxide was carried out to yield a polypropylene oxide having a number average molecular weight of about 19,000 (a molecular weight relative to polystyrene standard measured by using a HLC-8120 GPC manufactured by Tosoh Corp. as a liquid delivery system, a column of TSK-GEL H-type manufactured by Tosoh Corp., and THF as a solvent). Then, a methanol solution of NaOMe was added in an amount of 1.2 equivalents in relation to the hydroxy group of the above hydroxy-terminated polypropylene oxide, the methanol was distilled off, and allyl chloride was further added to thereby convert the terminal hydroxy group into an allyl group. Thus, an allyl group-terminated polypropylene oxide having a number average molecular weight of about 19,000 was obtained.

To 100 parts by weight of the obtained, crude allyl-terminated polypropylene oxide, 300 parts by weight of n-hexane and 300 parts by weight of water were added. The mixture thus obtained was stirred to mix, and then the water was removed by centrifugal separation. To the hexane solution thus obtained, 300 parts by weight of water was further added, the mixture thus obtained was stirred to mix, the water was again removed by centrifugal separation, and then the hexane was distilled off under reduced pressure to yield a purified, allyl group-terminated polypropylene oxide (hereinafter referred to as allyl polymer). To 100 g of the obtained allyl polymer, an isopropyl alcohol solution of platinum vinylsiloxane complex of 3 wt % in terms of platinum was added as a catalyst in 150 ppm, and the allyl polymer was reacted with 1.35 parts by weight of methyldimethoxysilane at 90° C. for 5 hours to yield a methyldimethoxysilyl group terminated polypropyleneoxide (A-1).

EXAMPLES 1 TO 4 AND COMPARATIVE EXAMPLES 1 AND 2

The reactive silicon group-containing polyoxyalkylene polymer (A-1) obtained in Synthesis Example 1 was used as the (A) component, and a filler, titanium oxide, a plasticizer, an antisagging agent, an ultraviolet absorber, a photostabilizer, a dehydrating agent, an adhesion-imparting agent and a crosslinking agent were weighed out, and a (B) component, a (C) component and a (D) component, and an organotin catalyst were also weighed out to be used as the curing catalysts, according to the formulations shown in Table 1; all these ingredients were mixed together with a mixer to prepare one-part curable compositions, which were sealed in aluminum cartridges.

By use of the prepared one-part curable compositions, various physical properties were investigated on the basis of the following procedures.

(Curing Test)

The curable compositions each were extruded from the cartridge and filled in a molding frame of about 5 mm in thickness with a spatula; the surface of each of the filled compositions was fully flattened, and the planarization completion time was set as the curing starting time. Every one minute, the surface of each of the compositions was touched with a spatula, and the skin formation time was measured as the time when the composition no longer stuck to the spatula. The skin formation time measurement was made for each of the compositions, after a storage at 23° C. for 7 days (the initial stage), after a storage at 50° C. for 7 days and after a storage at 50° C. for 4 weeks, respectively, the elapsed times being counted from the completion of the one-component cartridge preparation; thus, the curing time after a varying period of storage was investigated. The results obtained are shown in Table 1. In the table, A and B denote the retardation rates of the curing time after storage (the skin formation time after the storage at 50° C. for 4 weeks/the initial skin formation time) of less than 1.5 and 1.5 or more, respectively.

(Tensile Properties of the Cured Substances)

The curable compositions each were filled in a sheet-shaped molding frame of 3 mm in thickness, the surface of each of the compositions was fully flattened, and the compositions were aged at 23° C. for 3 days and additionally at 50° C. for 4 days. The aged compositions each were blanked into a dumbbell-shaped cured substance by use of a dumbbell-shaped die. By use of each of these dumbbell-shaped specimens, the tensile test was carried out at a tensile rate of 200 mm/min to measure the M50:50% tensile modulus (MPa), Tb: the tensile strength at break (MPa) and Eb: the elongation at break (%). The results obtained are shown in Table 1.

(Recovery Ratio)

Reference lines were marked with an interval of 20 mm on the dumbbell-shaped specimens prepared in a manner similarly to the above. These specimens were fixed under a condition of 100% elongation at a constant temperature of 60° C. so that the reference line interval changed from 20 mm to 40 mm. After 24 hours, the fixation was released and the specimens were allowed to stand still in a temperature-controlled room at 23° C.; the recovery ratios after 1 hour were measured. The results obtained are shown in Table 1.

(Creep Measurement)

Dumbbell-shaped cured substances were prepared in a manner similar to the above, and one end of each of the dumbbell-shaped specimens was fixed in an oven at 60° C. to hang each of the dumbbell-shaped specimens. The lower end of each of the hanging dumbbell-shaped specimens was subjected to a load of 0.4 times the M50 value obtained in the above measurement of the tensile properties of the cured substance concerned. The displacement difference in the separation between the marked reference lines between immediately after loading and at an elapsed time of 200 hours was measured. It is to be noted that the smaller is the displacement difference, the better is the creep resistance. The results obtained are shown in Table 1.

EXAMPLES 5 AND 6 AND COMPARATIVE EXAMPLES 3 AND 4

The reactive silicon group-containing polyoxyalkylene polymer (A-1) obtained in Synthesis Example 1 was used as

TABLE 1

| Composition (parts by weight) | | | Ex. 1 | Ex. 2 | Ex. 3 | Ex. 4 | Comp. ex. 1 | Comp. ex. 2 |
|---|---|---|---|---|---|---|---|---|
| (A) component | A-1 | | 100 | 100 | 100 | 100 | 100 | 100 |
| Filler | Hakuenka CCR[1] | Shiraishi Kogyo Kaisha, Ltd. | 120 | 120 | 120 | 120 | 120 | 120 |
| Titanium oxide | Tipaque R-820 | Ishihara Sangyo Kaisha, Ltd. | 20 | 20 | 20 | 20 | 20 | 20 |
| Plasticizer | DIDP[2] | Kyowa Hakko Co., Ltd. | 30 | 30 | 30 | | 30 | 30 |
| | Actocol P23[3] | Takeda Pharmaceutical Co., Ltd. | | | | 30 | | |
| Antisagging agent | Disparlon #6500[4] | Kusumoto Chemicals, Ltd. | 2 | 2 | 2 | 2 | 2 | 2 |
| Ultraviolet absorber | Tinuvin 327[5] | Ciba-Geigy Ltd. | 1 | 1 | 1 | 1 | 1 | 1 |
| Photostabilizer | Sanol LS-770[6] | Sankyo Co., Ltd. | 1 | 1 | 1 | 1 | 1 | 1 |
| Dehydrating agent | A-171[7] | Japan Unicar Co., Ltd. | 2 | 2 | 2 | 2 | 2 | 2 |
| Adhesion-imparting agent | A-1120[8] | Japan Unicar Co., Ltd. | 3 | 5 | 5 | 5 | 5 | 3 |
| Crosslinking agent | Methyl silicate 51[9] | Colcoat Co., Ltd. | 2 | 2 | 2 | 2 | 2 | 2 |
| (B) component | Neostann U-50[10] | Nitto Kasei Co., Ltd. | | 3.4 | 3.4 | 3.4 | 3.4 | |
| | Neostann U-28[11] | Nitto Kasei Co., Ltd. | 3 | | | | | |
| (C) component | Versatic 10[12] | Japan Epoxy Resin Co., Ltd. | | 1 | 1 | 1 | | |
| | 2-Ethylhexanoic acid | Wako Pure Chemical Industries, Ltd. | 1 | | | | | |
| (D) component | Laurylamine | Wako Pure Chemical Industries, Ltd. | 0.75 | 0.75 | | 0.75 | 0.75 | |
| | DEAPA[13] | Koei Chemical Industry Co., Ltd. | | | 0.53 | | | |
| Organotin | Neostann U-220[14] | Nitto Kasei Co., Ltd. | | | | | | 2 |
| Curing time | Skin formation time (min) | Initial | 141 | 93 | 67 | 78 | 106 | 30 |
| | | After storage at 50° C. for 1 week | 150 | 91 | 62 | 80 | 170 | 23 |
| | | After storage at 50° C. for 4 weeks | 197 | 110 | 96 | 63 | 210 | 30 |
| Storage stability | Curing retardation | | A | A | A | A | B | A |
| Tensile properties | M50 | (MPa) | 0.80 | 0.83 | 0.88 | 0.80 | 0.75 | 0.73 |
| | Tb | (MPa) | 2.8 | 2.86 | 2.75 | 2.44 | 3.03 | 2.6 |
| | Eb | (%) | 485 | 437 | 380 | 385 | 536 | 432 |
| Recovery ratio | | (%) | 74 | 70 | 71 | 68 | 72 | 29 |
| Creep property | Displacement difference | (mm) | 2 | 3 | 3 | 3 | 3 | 30 |

[1]Precipitated calcium carbonate
[2]Diisodecyl phthalate
[3]PPG3000
[4]Fatty acid amide wax
[5]2-(3,5-Di-t-butyl-2-hydroxyphenyl)-5-chlorobenzotriazole
[6]Bis(2,2,6,6-tetramethyl-4-piperidyl) sebacate
[7]Trimethoxyvinylsilane
[8]$H_2NC_2H_4NHC_3H_6Si(OMe)_3$
[9]Condensate of tetramethoxysilane (Si content: 51%)
[10]Tin(II) neodecanoate Metal(Sn) content: 22 to 24%
[11]Tin(II) 2-ethylhexanoate Metal(Sn) content: 28%
[12]Neodecanoic acid
[13]3-Diethylaminopropylamine
[14]Dibutyltin(IV) bisacetylacetonate Metal(Sn) content: 27.5%

As Comparative Example 2 in Table 1 shows, when Neostann U-220, a tetravalent organotin, was used as the silanol condensation catalyst, the recovery ratio and the creep resistance were poor. On the contrary, as Examples 1 to 4 and Comparative Example 1 show, when a divalent tin carboxylate, was used, the recovery ratio and the creep resistance displayed excellent results. Moreover, as in Comparative Example 1, only divalent tin was used but no acid was added, the catalytic activity was found to be degraded after storage, and hence the curing time was elongated; however, as in Examples 1 to 4, when an acid was added, the curing retardation after storage was considerably suppressed. When DEAPA (3-diethylaminopropylamine) was used as the (D) component, the curability was improved as compared to the case in which laurylamine was used. Moreover, when PPG3000 was used as a plasticizer, the curability is somewhat improved as compared to the case in which DIDP was used, and no curing retardation after storage was found.

the (A) component; a filler, titanium oxide, a plasticizer, an antisagging agent, an ultraviolet absorber, a photostabilizer, a dehydrating agent and an adhesion-imparting agent were weighed out according to the prescriptions shown in Table 2; and the (B) component, the (C) component, and the (D) component were also weighed out to be used as the curing catalysts, according to the prescriptions shown in Table 2; all these ingredients were mixed together with a mixer to prepare one-part curable compositions, which were sealed in aluminum cartridges.

The one-part curable compositions, stored at 23° C. for 7 days after preparation, each were extruded from the cartridge so that the compositions each were adhered to an adherend (anode oxidized aluminum, pure aluminum, cold rolled stainless steel plate, hard PVC, FRP), and were aged at 23° C. for 7 days. Thereafter, the compositions were subjected to a 90 degree hand peel test. The breakdown conditions of the respective cured substances were observed and the cohesion failure rates (CF rates) thereof were investigated; A and B denote the average CF rates of 60% or more and less than 60%, respectively, for each of the substrates. The results obtained are shown in Table 2.

TABLE 2

| Composition | | | Ex. | | Comp. ex. | |
|---|---|---|---|---|---|---|
| (parts by weight) | | | 5 | 6 | 3 | 4 |
| (A) component | A-1 | | 100 | 100 | 100 | 100 |
| Filler | Hakuenka CCR[1] | Shiraishi Kogyo Kaisha, Ltd. | 120 | 120 | 120 | 120 |
| Titanium oxide | Tipaque R-820 | Ishihara Sangyo Kaisha, Ltd. | 20 | 20 | 20 | 20 |
| Plasticizer | DIDP[2] | Kyowa Hakko Co., Ltd. | 55 | 55 | 55 | 55 |
| Antisagging agent | Disparlon #6500[3] | Kusumoto Chemicals, Ltd. | 2 | 2 | 2 | 2 |
| Ultraviolet absorber | Tinuvin 327[4] | Ciba-Geigy Ltd. | 1 | 1 | 1 | 1 |
| Photostabilizer | Sanol LS-770[5] | Sankyo Co., Ltd. | 1 | 1 | 1 | 1 |
| Dehydrating agent | A-171[6] | Japan Unicar Co., Ltd. | 2 | 2 | 2 | 2 |
| Adhesion-imparting agent | A-1120[7] | Japan Unicar Co., Ltd. | 5 | 5 | 5 | 5 |
| (B) component | Neostann U-50[8] | Nitto Kasei Co., Ltd. | 3.4 | 3.4 | 3.4 | 3.4 |
| (C) component | Versatic 10[9] | Japan Epoxy Resin Co., Ltd. | 0.5 | 1 | 1.5 | 2 |
| (D) component | Laurylamine | Wako Pure Chemical Industries, Ltd. | 0.75 | 0.75 | 0.75 | 0.75 |
| Curing time | Skin formation time (min) | | 110 | 92 | 80 | 75 |
| Adhesion | | | A | A | B | B |

[1]Precipitated calcium carbonate
[2]Diisodecyl phthalate
[3]Fatty acid amide wax
[4]2-(3,5-Di-t-butyl-2-hydroxyphenyl)-5-chlorobenzotriazole
[5]Bis(2,2,6,6-tetramethyl-4-piperidyl) sebacate
[6]Trimethoxyvinylsilane
[7]$H_2NC_2H_4NHC_3H_6Si(OMe)_3$
[8]Tin(II) neodecanoate Metal(Sn) content: 22 to 24%
[9]Neodecanoic acid As shown in Table 2, a better adhesion was displayed in a case where there was added an acid (Example 6; neodecanoic acid: 1 g/5.8 mmol) of a molar quantity not more than the added molar quantity of divalent tin as a silanol catalyst (Neostann U-50: 3.4 g/7.4 mmol) as compared to a case where there was added an acid (Comparative Example 3; neodecanoic acid: 1.5 g/8.7 mmol) in an amount larger than the equivalent of the divalent tin. It is to be noted that here are used for explanation the added amounts based on 100 g of the (A) component.

The invention claimed is:

1. A one-part curable composition, comprising:
   (A) an organic polymer having a silicon-containing group capable of cross-linking by forming siloxane bonds;
   (B) a metal carboxylate in which the carbon atom adjacent to the carbonyl group constituting the carboxylic acid is a quaternary carbon atom; and
   (C) a carboxylic acid smaller in molar quantity than said (B) component metal carboxylate.

2. The one-part curable composition according to claim 1, in which the (A) component organic polymer has a number average molecular weight falling within a range from 500 to 50,000, and has on average, at the terminal of the main chain and/or the side chains, one or more silicon-containing groups per one molecule represented by the general formula (1):

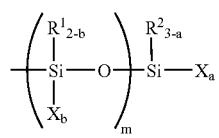

(1)

where $R^1$ and $R^2$ are each independently an alkyl group having 1 to 20 carbon atoms, an aryl group having 6 to 20 carbon atoms, an aralkyl group having 7 to 20 carbon atoms or a triorganosiloxy group represented by $(R')_3SiO$—(R's are each independently a substituted or a non-substituted hydrocarbon group having 1 to 20 carbon atoms); Xs are each independently a hydroxy or a hydrolyzable group; a is any one of 0, 1, 2, and 3, b is any one of 0, 1, and 2, and a and b are not to be 0 simultaneously; and m is 0 or an integer of 1 to 19.

3. The one-part curable composition according to claim 2, in which X is an alkoxy group.

4. The one-part curable composition according to claim 1, in which the (A) component organic polymer is one or more polymers selected from the group consisting of a polyoxyalkylene polymer, a saturated hydrocarbon polymer, and a (meth)acrylate polymer.

5. The one-part curable composition according to claim 4, in which the polyoxyalkylene polymer is a polyoxypropylene polymer.

6. The one-part curable composition according to claim 1, in which the (B) component is a tin carboxylate.

7. The one-part curable composition according to claim 6, in which the (B) component is a divalent tin carboxylate.

8. The one-part curable composition according to claim 1, in which the (C) component is a fatty acid.

9. The one-part curable composition according to claim 8, in which the (C) component is a carboxylic acid in which the carbon atom adjacent to the carbonyl group is a quaternary carbon atom.

10. The one-part curable composition according to claim 1, comprising the (B) component in a content of 0.01 to 20 parts by weight and the (C) component smaller in molar quantity than the (B) component and in a content of 0.01 to 20 parts by weight in relation to 100 parts by weight of the (A) component.

11. The one-part curable composition according to claim 1, further comprising an amine compound as the (D) component.

12. The one-part curable composition according to claim 11, in which the (D) component amine compound is a primary amine.

13. The one-part curable composition according to claim 11, in which the (D) component amine compound is an amine compound containing as a substituent a hydrocarbon group containing at least one hetero atom.

14. The one-part curable composition according to claim 13, in which the (D) component amine compound is an amine compound containing a hydrocarbon group having a hetero atom at the carbon atom of at least one position of positions 2 to 4.

15. The one-part curable composition according to claim 11, comprising 0.01 to 20 parts by weight of the (D) component in relation to 100 parts by weight of the (A) component.

16. An adhesive for interior panel, an adhesive for exterior panel, an adhesive for tiling, an adhesive for stone tiling, an adhesive for finishing ceiling, an adhesive for finishing floor, an adhesive for finishing wall, an adhesive for vehicle panel, an adhesive for assembling electric, electronic and precision instruments, a sealant for direct glazing, a sealant for double glazing, a sealant for the SSG technique or a sealant for working joints of buildings, each comprising the one-part curable composition according to claim 1.

17. An adhesive for interior panel, an adhesive for exterior panel, an adhesive for tiling, an adhesive for stone tiling, an adhesive for finishing ceiling, an adhesive for finishing floor, an adhesive for finishing wall, an adhesive for vehicle panel, an adhesive for assembling electric, electronic and precision instruments, a sealant for direct glazing, a sealant for double glazing, a sealant for the SSG technique or a sealant for working joints of buildings, each comprising the one-part curable composition according to claim 7.

18. An adhesive for interior panel, an adhesive for exterior panel, an adhesive for tiling, an adhesive for stone tiling, an adhesive for finishing ceiling, an adhesive for finishing floor, an adhesive for finishing wall, an adhesive for vehicle panel, an adhesive for assembling electric, electronic and precision instruments, a sealant for direct glazing, a sealant for double glazing, a sealant for the SSG technique or a sealant for working joints of buildings, each comprising the one-part curable composition according to claim 11.

* * * * *